(12) United States Patent
Farmwald

(10) Patent No.: US 6,798,769 B1
(45) Date of Patent: Sep. 28, 2004

(54) SYSTEM FOR ENHANCING DATA TRANSFER

(75) Inventor: P. Michael Farmwald, Portola Valley, CA (US)

(73) Assignee: Pedestal Networks, Inc., Fremont, CA (US)

( * ) Notice: Subject to any disclaimer, the term of this patent is extended or adjusted under 35 U.S.C. 154(b) by 121 days.

(21) Appl. No.: 09/951,351

(22) Filed: Sep. 13, 2001

(51) Int. Cl.[7] .............................. H04L 12/66; H04J 3/04
(52) U.S. Cl. ...................... 370/352; 370/485; 370/532
(58) Field of Search ................................. 370/352, 468, 370/465, 536, 537, 538, 540, 545, 532, 230, 235, 463, 485, 493

(56) References Cited

U.S. PATENT DOCUMENTS

| | | | | |
|---|---|---|---|---|
| H1175 H | * | 4/1993 | Giorgio | 370/536 |
| 5,390,239 A | * | 2/1995 | Morris et al. | 379/93.08 |
| 5,898,761 A | * | 4/1999 | McHale et al. | 379/93.01 |
| 5,923,671 A | * | 7/1999 | Silverman | 370/542 |
| 6,005,873 A | * | 12/1999 | Amit | 370/494 |
| 6,084,874 A | * | 7/2000 | Nguyen et al. | 370/352 |
| 6,160,808 A | * | 12/2000 | Maurya | 370/389 |

* cited by examiner

Primary Examiner—Chau Nguyen
Assistant Examiner—Soon-Dong Hyun

(57) ABSTRACT

High-speed data transfer rates are provided between a central office and customer premise equipment with a multiplexer that is interposed between the central office and the customer premise equipment, and that functions as a remote access node. The multiplexer communicates at high data rates via downstream data links such as twisted-pair conductors between the multiplexer and the customer premise equipment. By positioning the multiplexer physically close to the customer premise equipment, DSL data rates can be achieved. In one application, the multiplexer assigns a variable number of the upstream data links between the central office and the multiplexer on a dynamic, adaptive, and automatic basis to individual ones of the downstream data links. In this way, unused data link capacity of the upstream data links is used to provide high data transmission rates when required between the multiplexer and the central office. In another application, the multiplexer includes a dynamic switching matrix that dynamically connects one or more downstream modems with selected customer premise equipment. In this way, modems in the multiplexer are time-shared among the various subscribers and connection costs are reduced.

19 Claims, 14 Drawing Sheets

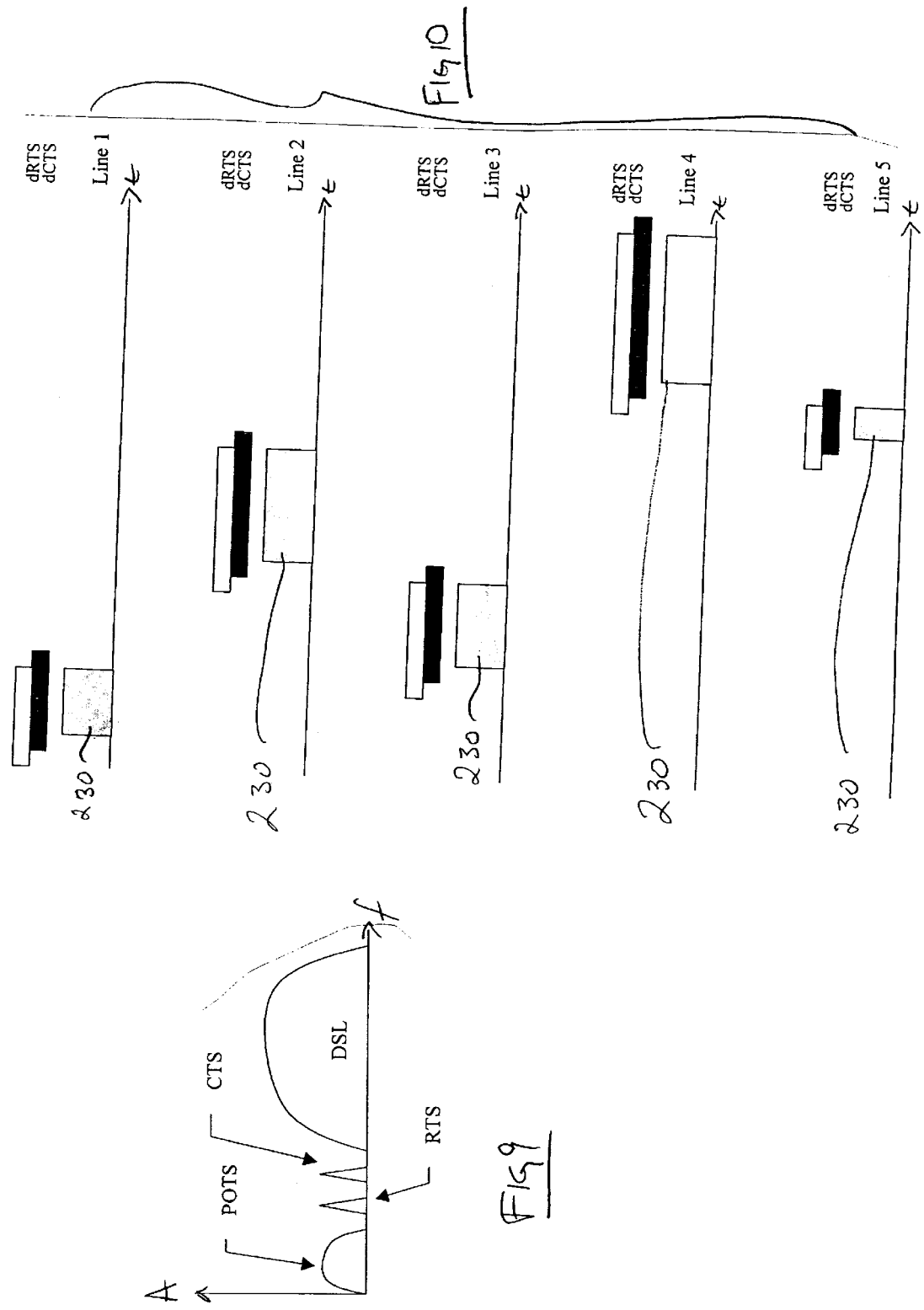

SYSTEM FOR ENHANCING DATA TRANSFER

BACKGROUND

This invention relates to the enabling of broadband data transfer between a Public Service Network and customer premise equipment.

Various types of modems are conventionally used in transferring data to and from customer premise equipment via the telephone system. Conventional POTS (Plain Old Telephone System) modems have long been used, and in a typical application the customer premise includes a POTS modem and the central office includes a pool of POTS modems. More recently, digital modems such as xDSL, ISDN, and other digital modems have come into widespread use due to their inherent ability to support higher speeds. As before, when digital modems are used a digital modem is provided at the customer premise, and a bank of digital modems is provided, usually at the central office. This bank of digital modems is often referred to as a DSLAM (Digital Subscriber Line Access Multiplex). The DSLAM is further connected to a metropolitan network, enabling "always on" connections to Internet service providers (ISP's) and the Internet.

The path length between two modems principally determines the maximum rate at which information can be exchanged between them. The end points of this path are usually the customer or user's premise (home) and the central office. A distance of 12,000 feet can support a 1.5 mbit/sec ADSL link, while a distance of 2000 feet can support a 6 mbit/sec VDSL link. Too often the wire path distance exceeds the practical limit of Digital Subscriber Line (DSL) modems, which for the lowest-rate xDSL service (IDSL) is approximately 20,000 feet. However, analog POTS modems, such those implementing the V.92 standard, can carry data at a rate of up to 56 Kbps over the same path. Greater distances will reduce the maximum data transfer rate, for example to 26 Kbps.

The public telephone network architecture was originally designed to meet the requirements for conveying voice signals over dedicated lines. A line path consists of spliced or contiguous twisted pairs of copper wire. Although the wire pairs may originate together in a bundle (or trunk) at the same location such as the central office, they terminate at different lengths, as each user premise is usually located at a unique distance from the central office. While the longest path may just meet voice requirements, shorter paths have greater data rate potential that, up until the advent of DSL, went untapped.

At the present time, approximately 50% of all homes connected to a typical central office cannot be serviced by DSL due to the fact that (a) the home is served by a Digital Loop Carrier (DLC), or (b) the cable distance between the serving Central Office and the home exceeds the distance required for xDSL services. One solution is to wait until a future date when either multiple mid-span repeaters or amplifiers are installed along the telephone wire path from the central office to the customer or user's premise, or until remote DSLAM's are installed closer to the more distant user's home or premise. Both these solutions fall short for a number of technical and logistical reasons.

Potentially, mid-span repeaters or amplifiers can be installed at several points along the path of the telephone cable. Unless there are simple plug/socket connections at the end points of wire bundle segments, and the segments are already conveniently located at suitable points along the path, each mid-span unit will require splicing of wire bundles or careful assignment of individual wires matching the mapping of wires in the original junction box that the mid-span amplifier unit replaces.

A remote DSLAM such as the Copper Mountain CopperEdge 200 RT DSL Concentrator requires a large cabinet, a power source, and a T-1 or fiber optic digital link from the cabinet to the central office. A T-1 link over a traditional four-wire pair to the central office may not provide an adequately high data rate, and therefore mid-span repeaters may be needed in addition to the remote DSLAM installation itself. The remote DSLAM is usually only economical for dense clusters of potential users, and is not well suited for the sparse and scattered distribution pattern of suburban or rural homes.

Thus, a need presently exists for improved systems for the enabling and transport of new broadband data services to and from customer premise equipment at high data rates.

SUMMARY

By way of introduction, the systems described below transfer data via a multiplexer which is installed between a network interface (such as a central office) and customer premise equipment. The multiplexer functions as a remote access node, and it is coupled with the network interface either directly or indirectly via a set of upstream data links and with the customer premise equipment by a set of downstream data links. This multiplexer automatically, dynamically, and adaptively routes data between an appropriate number of the upstream data links and each downstream data link, in accordance with currently-prevailing data-rate requirements.

In one application, when any one of the customer premise equipment requests a first, lower-data-rate class of service (e.g. by issuing a http service request), the multiplexer transfers data between the associated downstream data link serving the customer and a single one of the upstream data links. Additionally, when any of the customer premise equipment requests a second, higher-data-rate class of service (e.g. by issuing a FTP service request), the multiplexer transfers data between the associated downstream data link and two, or more upstream data links. By allocating an appropriate number of the upstream data links to each downstream data link in accordance with the data-rate requirements of the downstream data link, the data-carrying capacity of the upstream data links is used efficiently, and improved levels of service can be provided,to the customer premise equipment using the currently-installed data links.

In another application, one or more DSL modems included in the multiplexer are dynamically time-shared among a larger number of subscribers. In this way, DSL service is provided in a particularly cost-efficient manner to every subscriber served by the multiplexer.

The foregoing paragraphs have been provided by way of general introduction, and they should not be used to narrow the scope of the following claims.

BRIEF DESCRIPTION OF THE DRAWINGS

FIG. 9 is a frequency vs. amplitude diagram illustrating frequency band assignments used in one embodiment of the system of FIG. 8.

FIGS. 10 and 11 are timing diagrams illustrating the relative timing of request-to-send and clear-to-send signals for data transfer in the downstream and upstream directions, respectively.

DETAILED DESCRIPTION OF THE PRESENTLY PREFERRED EMBODIMENTS

The following sections will first describe first and second embodiments of the multiplexer of this invention, before turning to a discussion of specific implementations.

The Embodiment of FIGS. 1–7c

Figure 1:
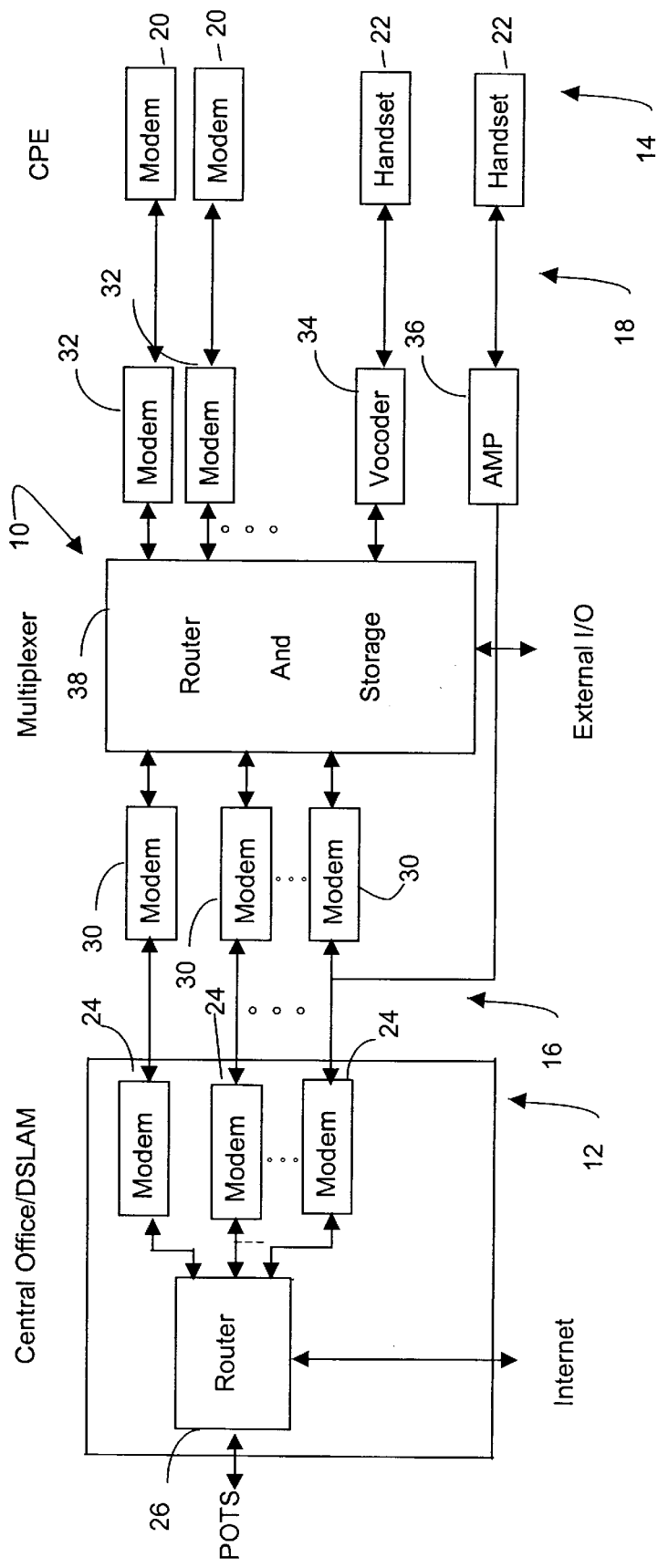
FIG. 1 is a block diagram illustrating a first preferred embodiment of the system of this invention coupled between a Telephone Company Central Office and customer premise equipment.

Turning now to the drawings, FIG. 1 illustrates a first preferred embodiment of the multiplexer 10 of this invention, coupled between a network interface such as a central office 12 and a set of customer premise equipment 14.

The multiplexer 10 is coupled with the central office 12 by a plurality of upstream data links 16, and the multiplexer performs the function of a remote access node. The upstream data links 16 will often take the form of conventional, twisted-pair conductors of the type conventionally used in a Plain Old Telephone System (POTS) line. Similarly, the multiplexer 10 is coupled with the customer premise equipment 14 by a set of downstream data links 18, which in this embodiment take the form of twisted-pair conductors that make up conventional POTS lines.

The customer premise equipment 14 includes a variety of devices used to send and receive data to and from the central office 12 via the respective downstream data links 18. By way of example, the customer premise equipment 14 can include modems 20 and handsets 22. The modems 20 can take many forms, including ISDN modems, DSL modems, and V. 90 or V. 92 modems, for example.

Splitters installed at various points along the telephone network may stop or diminish signals from passing from one side of the splitter to another. By the same virtue, the splitter permits the addition of a signal to a line on one side of the splitter. For services that are distinguished by signals respectively multiplexed by frequency within a common line or wire, Low Pass Filters (LPF) and High Pass Filters (HPF) can extract each signal and provide them to respective service equipment (CPE, modems, ports).

Traditionally, a LPF passes POTS to telephone CPE, which occupies 0 to 20 kHz, and a HPF provides the modem with DSL signals occupying the line spectrum above 20 kHz. In broader use, splitters separate services sharing a common line resource.

Other types of splitters include time slot filters, that can, for example, allow multiple customers connected to a common line via bridge taps to share the line resource, with the multiplexer's 10 internal splitters preventing signals generated by CPE connected to a line via bridge tap from interfering with equipment connected downstream of the multiplexer 10. The multiplexer 10 can also enable common bridge tap users to share a resource by frequency.

The central office 12 includes modems 24 coupled with respective upstream data links 16. The modems 24 are in turn coupled with a router 26. Each router 26 routes Internet protocol information to and from the Internet and the customer provided equipment.

As shown generally in FIG. 1, the multiplexer 10 includes a set of upstream modems 30, a set of downstream modems 32, one or more voice coders (vocoders) 34, and one or more amplifiers 36 or line drivers. The multiplexer 10 also includes a router and storage device 38 that communicates on the upstream side with the upstream modems 30 and on the downstream side with the downstream modems 32 and the vocoder 34. The router and storage device 38 operates as described below to route data from the modems 32 and the vocoder 34 to selected ones of the upstream data links 16 via the respective upstream modems 30, and to route data from one or more of the upstream modems 30 to a selected one of the downstream data links 18 via the respective downstream modem 32. The router and storage device 38 includes sufficient data storage to provide the buffering operations described below. The amplifier 36 couples a selected upstream data link 16 with the respective downstream data link 18, bypassing the modems 30, 32 and the router and storage device 38.

The foregoing description of the multiplexer 10 has discussed the functional blocks of the multiplexer 10. In actual practice, the multiplexer 10 can be implemented with physically discrete devices for the various functional blocks of FIG. 1. Alternately, a digital signal processor (DSP) of adequate capacity can be used to implement the modems 30, 32, the vocoder 34 and some functions of the router and storage device 38. In this embodiment, the modems 30, 32 and the vocoder 34 are preferably implemented as respective threads executed by a digital signal processor. General POTS service emulation, such as the set of BORSCHT features (Battery, Overvoltage, Ringing, Supervision, Coding, Hybrid, Testing) and Service Class Features (such as Caller ID and Call Waiting) and line activity measurements are also preferably implemented with a digital signal processor. When operating or not operating on a line, the multiplexer is transparent to POTS (BORSCHT, Call Class Services). A modern DSP consumes little power and is capable of executing many threads in parallel.

The modems 30, 32 can include POTS modems, such as V.90, V.92, or V.32 modems, and the modems can also or alternatively include DSL modems, such as SDSL, G.LIGHT, ADSL, and VSDL modems, and Home Phone Network Alliance (HPNA) modems. As an example, the voice coders or vocoders can be implemented as G.729, G.723, or AMR vocoders.

The buffer included in the router and storage device 38 may include large external memories for buffering and storing transported data packets. If desired, a direct memory access module can be used for sharing memory within the router and storage device 38. The device 38 may include a digital signal processor and a CPU for executing an operating system and performing packet routing, switching, multiplexing, and traffic management. Typically, the device 38 will also include storage hardware such as IEDE and storage such as FLASH RAM for storing firmware, settings, records, logs, user parameters and traffic statistics. Off-hook detectors, such as software threads running on a DSP, can be provided for monitoring whether or not a particular line is in use. Often, expansion boards will be provided for connecting the device 38 to external I/O devices such as disk caches, wireless bridges, cellular telephone networks, land lines and fiber optic links. If desired, data security and encryption programs can be provided for enhanced data security.

All network processing, such as the Multi-link Point-to-Point processing, routing, switching, encryption (e.g. IPsec), data compression, buffer management, control, and other multiplexing operations described below are preferably executed as software threads running on a CPU, with possible network processor companions accelerating packet handling. System memory such as DRAM will serve as data buffers to hold packets for both DSP's, CPU's and network processors. The memory also stores the software (firmware) running on these processors. A non-volatile storage medium such as FLASH RAM is used to hold the equivalent of BIOS or boot firmware used to initialize the system.

The multiplexer 10 can be span-powered by a local −48VDC power supply, or by a higher voltage such as the 140V limit set by Bellcore GR-1089-CORE Class A3. Alternately, the multiplexer 10 may draw simplex power from the serving Central Office via upstream data links 16 or spare wire/cable pairs. The multiplexer 10 may draw power from a POTS line (talk battery) and/or an internal source (battery) and/or external sources (AC grid). A NiCad battery, for example, permits the multiplexer to signal "last gasp" or "dying gasp" to the Network Operation Center.

The multiplexer 10 is preferably constructed in accordance with Network Engineering Building Specifications (NEBS) Level 3, Telcordia GR-63-Core, Telcordia GR-1089-Core, TR-NWT-000057 (Environmental) and TR-NWT-000078, Safety UL 1950, 3rd Edition, and Emissions FCC Part 15 Class A EN55022 and EN55082-1. The various components of the multiplexer 10 can be mounted on circuit boards and inserted into a chassis. In many cases, the modems 30, 32 will be connected to the device 38 via FIFO buffers.

The multiplexer 10 adaptively, dynamically, and automatically responds to data transfer rate requirements on the downstream data links 18 to assign a constantly-varying number of the upstream data links 16 to each of the downstream data links 18. Unassigned upstream data links 16, including upstream data links not currently being used by the respective user, can be commandeered by the multiplexer 10 for upstream data traffic. Spare or unassigned upstream lines exist in many cases for future telephone service to new homes, for additional telephone lines for existing subscribers, and for rerouting in the event of problems with other lines. Although unassigned or spare lines traditionally have no dial-tone service, the ILEC (telephone company) may assign limited service to them for the purposes of providing improved data transfer for the multiplexer 10. Likewise, inactive downstream data links 18 can be used by the multiplexer 10 to carry additional data from other multiplexers in the same network. In this way, the data carrying capacity of the upstream data links 16 is efficiently used to provide desired levels of service for the downstream data links 18, all in accordance with real-time user demand.

Depending upon the application, there can be any desired number of upstream data links 16 and downstream data links 18. For example, in one application there can be 100 upstream data links 16 serving 25 downstream data links 18. Because it is statistically unlikely that a large fraction of the users coupled to the downstream data links 18 will require high data rate transfers at any given time, it is possible to provide a high-data-rate class of service to one or more users requiring it by automatically coupling each respective downstream data link 18 with a large set of upstream data links 16 (e.g., 4, 8 or 16) when needed to provide high-data-rate communication between the user and the central office. Because the multiplexer 10 can be located close to the customer premise equipment 14, the maximum data rate achievable on each of the downstream data links 18 will often be much greater than the maximum data rate achievable on each of the individual upstream data links 16.

Figure 2:
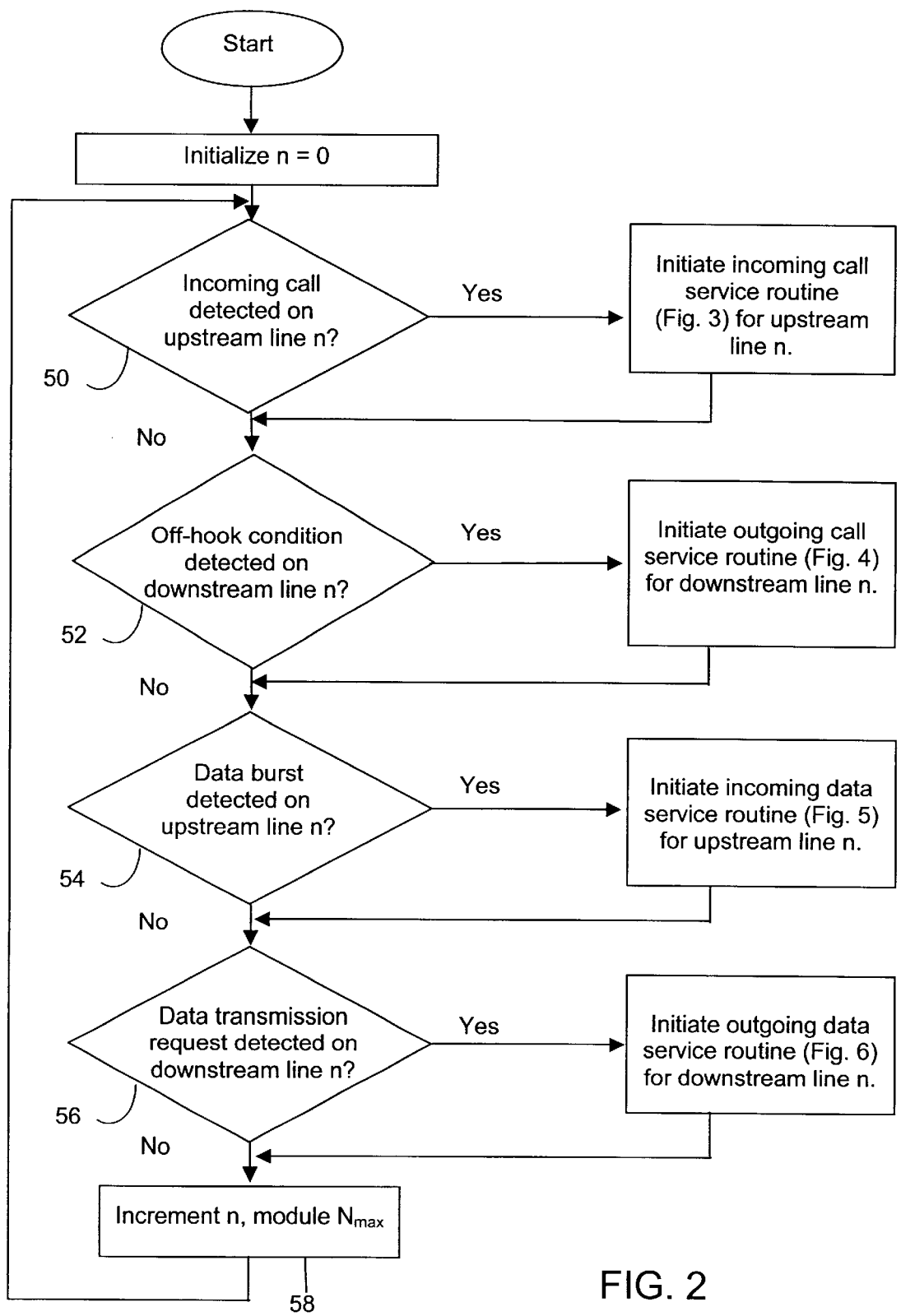
FIG. 2 is a flowchart of a process implemented by the multiplexer of FIG. 1.

Turning now to FIG. 2, the router and storage device 38 of FIG. 1 implements the monitoring functions flowcharted in FIG. 2. In FIG. 2, the parameter n identifies the data link or line number. This parameter n is initialized to a value of 0, and then four tests are performed in blocks 50, 52, 54, 56 with respect to upstream or downstream line n.

Figure 3:
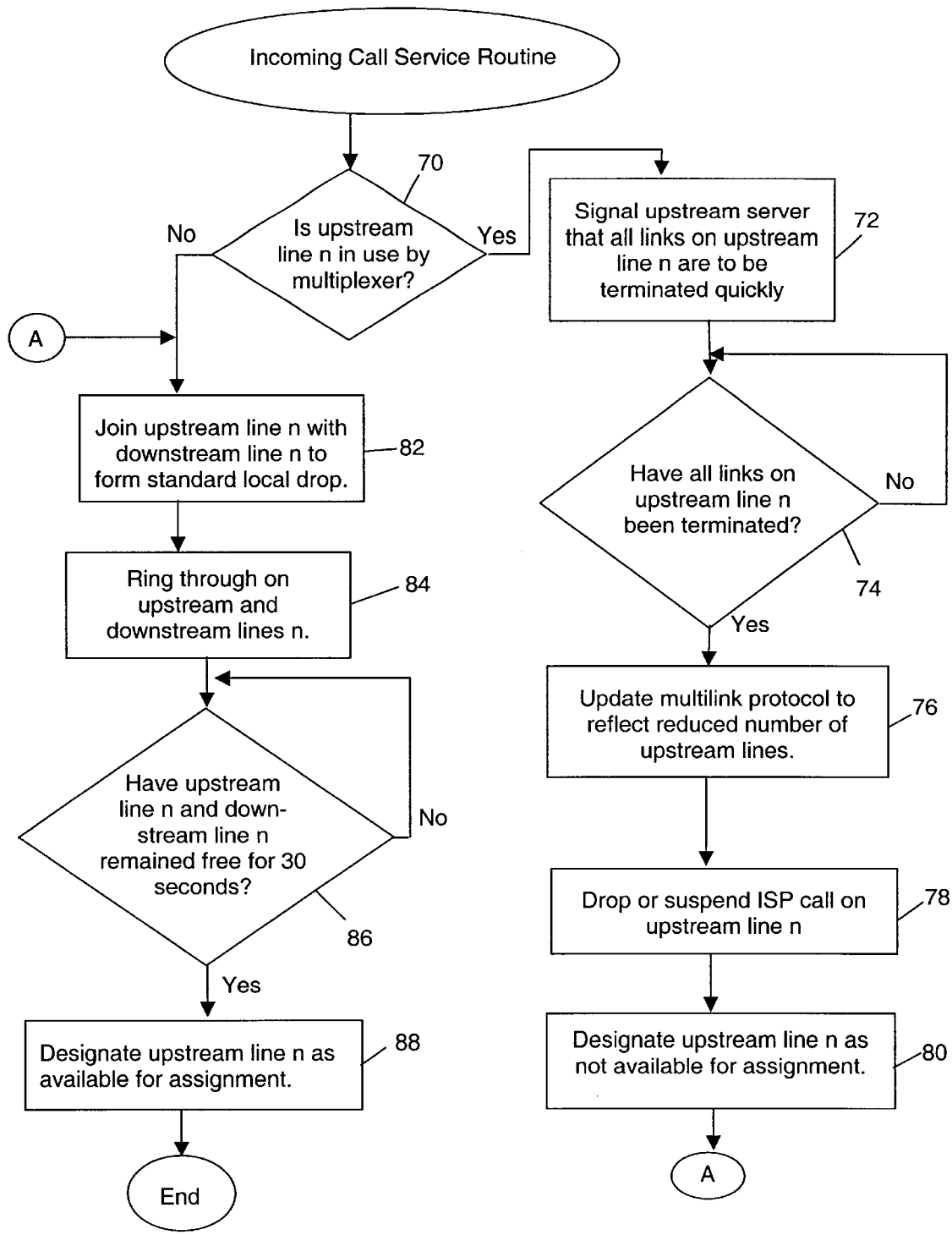
FIGS. 3, 4, 5 and 6 are flowcharts of respective service routines called by the process of FIG. 2.

First, a check is made in block 50 to determine whether an incoming call has been detected on upstream line n. Call Class Services such as Caller ID, or signaling (e.g. SS7) from the Central Office to remote switching functionality built into the multiplexer, may assist incoming call detection. If so, the incoming call service routine of FIG. 3 is initiated for upstream line n.

Figure 4:
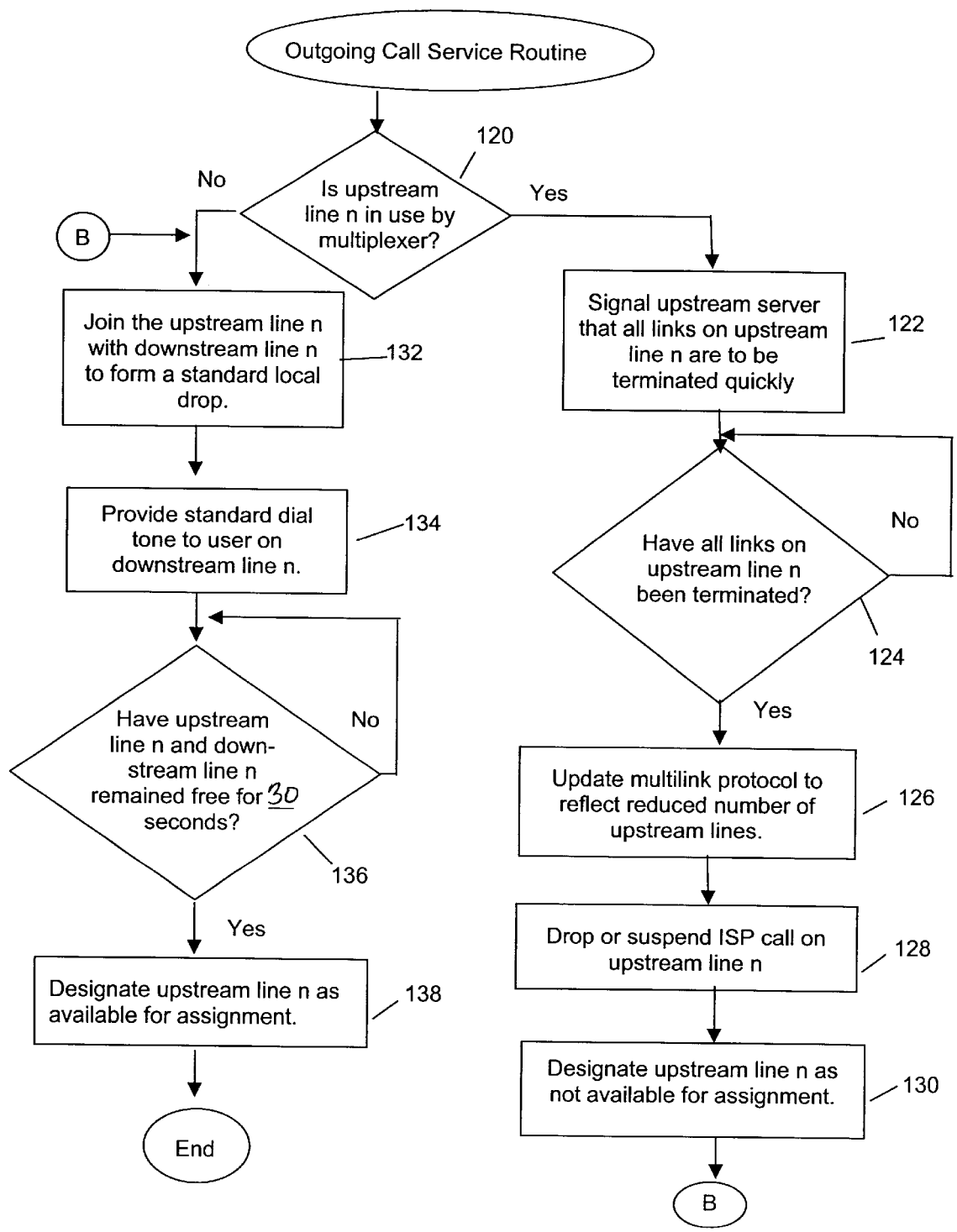

Next, the downstream line n is checked in block 52 to determine whether or not an off-hook condition has been detected, indicating that the user wishes to make an outgoing call. If an off-hook condition is detected, the outgoing call service routine of FIG. 4 is initiated for the downstream line n.

Figure 5:
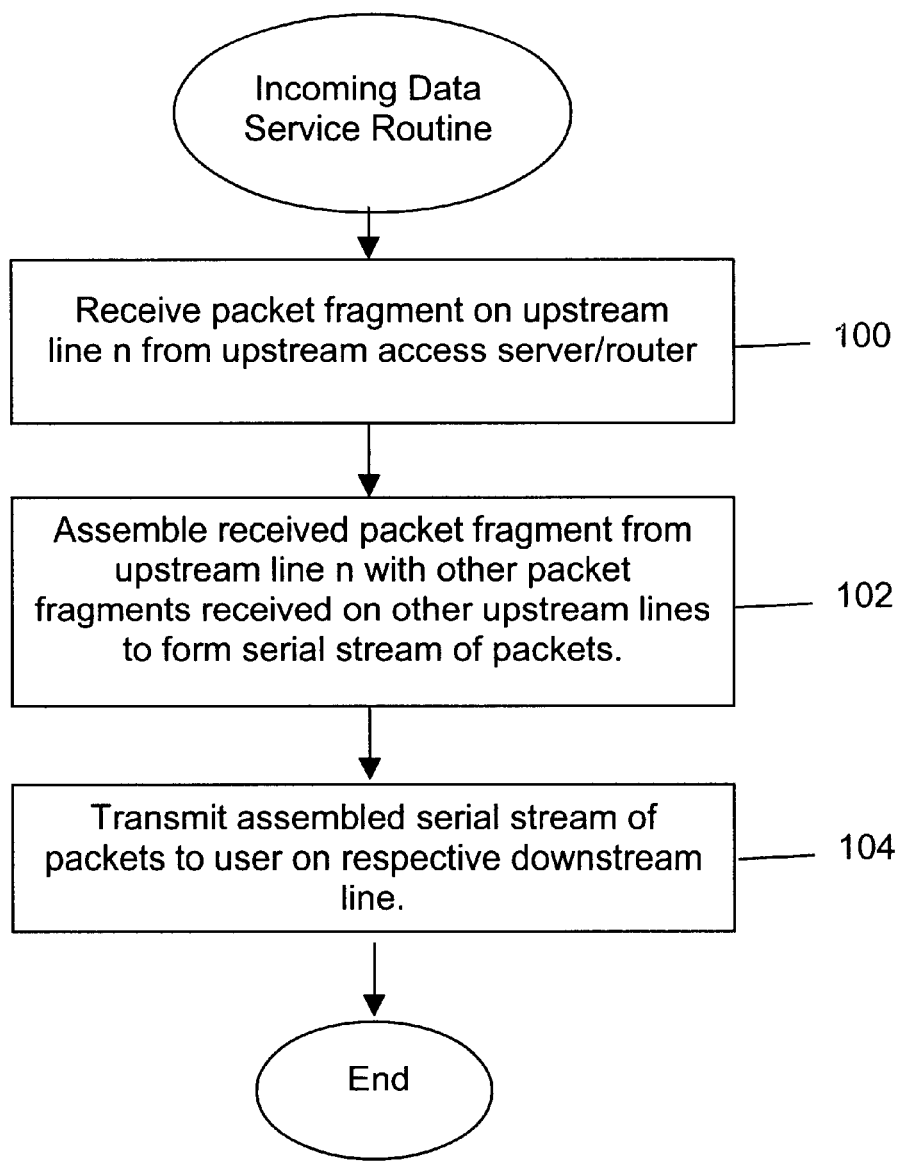

Next, the upstream line n is checked in block 54 to determine whether or not a data burst is being received. If so, the incoming data service routine of FIG. 5 is initiated for upstream line n.

Figure 6:
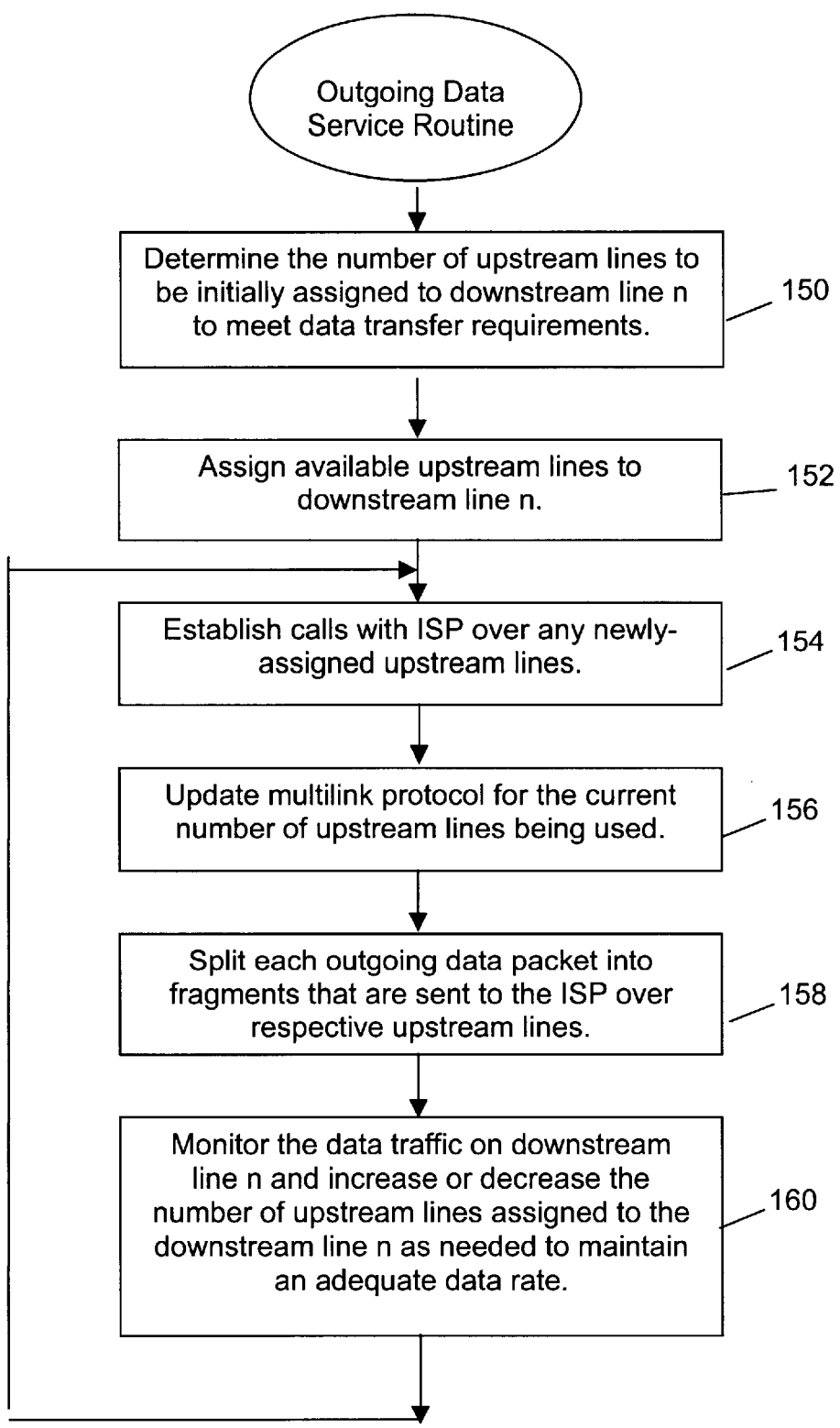
Figure 7:
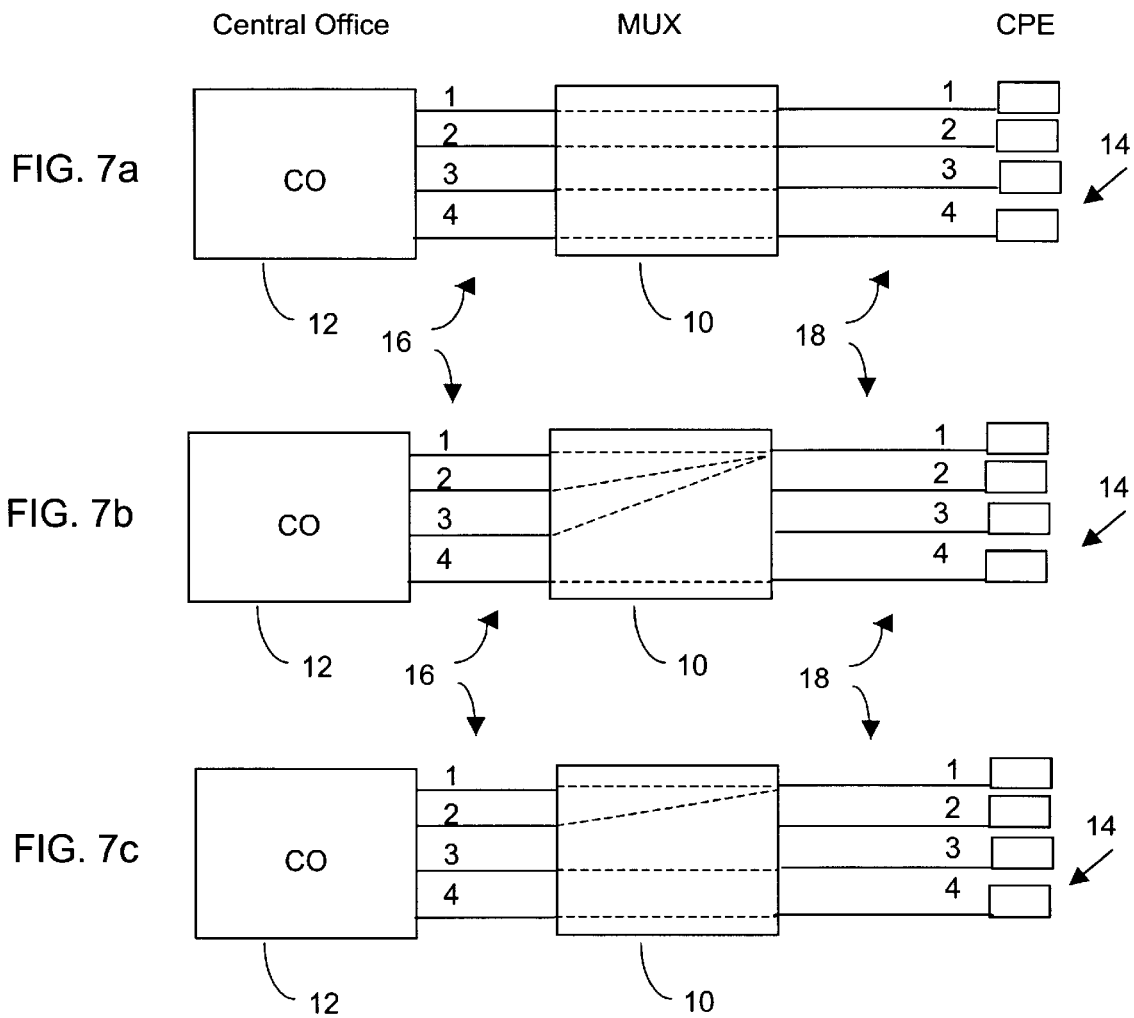
FIGS. 7a–7c are schematic diagrams illustrating three modes of operation of the multiplexer of FIG. 1.

Next, the downstream line n is monitored in block 56 to determine whether a data transmission request has been detected, as for example from a modem. If so, the outgoing data service routine of FIG. 6 is initiated for downstream line n.

Once the monitoring operations of blocks 50–56 have been performed, the parameter n is then incremented modulo NMAX, where NMAX is the highest number associated with any one of the upstream or downstream lines or data links. Control is then returned to block 50.

The routine of FIG. 2 thus monitors the upstream lines and the downstream lines to determine the conditions discussed above. As explained below, the four service routines of FIGS. 3–6 assign upstream data links as appropriate to provide efficient data transfer at high data transfer rates between the customer premise equipment and the central office.

As shown in FIG. 3, when an incoming call is detected on upstream line n, the router and storage device 38 (FIG. 1) first checks in block 70 to determine whether the upstream line n is currently in use by the multiplexer 10 (i.e. assigned to a specific downstream line). If the upstream line is currently in use, control is transferred to block 72, in which upstream servers are signaled that all links on the upstream line n are to be terminated quickly. Next, the routine waits in block 74 until all links on upstream line n have been terminated. Then, the multi-link protocol is updated in block 76 to reflect a reduced number of upstream lines, and in block 78 the ISP call on the upstream line n is dropped or suspended. The routine then designates the upstream line n as not available for assignment in block 80 and transfers control to block 82. At this point, the upstream line n is free of traffic, either because the upstream line n was not in use by the multiplexer, or because all multiplexer-initiated calls on upstream line n have been dropped or suspended.

Next, the upstream line n is coupled with the downstream line n in block 82 to form a standard local drop, and the incoming call is allowed to ring through on upstream and downstream lines n. The routine then monitors in block 86 to determine whether or not the upstream and downstream lines n have remained free for a predetermined time period, such as 30 seconds. If so, it is assumed that the incoming call has been completed, that the caller has not made an immediate outgoing call, and that the upstream line n can therefore be designated in block 88 as available for assignment by the multiplexer.

The outgoing call service routine of FIG. 4 is initiated when a user wishes to make an outgoing call on downstream line n. First, the multiplexer determines in block 120 whether the upstream line n is in use by the multiplexer. If so, control is transferred to block 122, and the multiplexer signals upstream servers that all links on the upstream line n are to be terminated quickly. The multiplexer waits in block 124 until all links on the upstream line n have been terminated, and then updates the multi-link protocol to reflect a reduced number of upstream lines in block 126. Then the ISP call on the upstream line n is dropped or suspended in block 128, and the upstream line n is designated as not available for assignment by the multiplexer in block 130. Control is then transferred to block 132.

Thus, upon initiation of the function of block 132 either the upstream line n was not in use by the multiplexer, or alternately calls on the upstream line n have been dropped or suspended. In block 132 the upstream line n is joined with the downstream line n to form a standard local drop. Then the multiplexer provides the standard dial tone to the user on downstream line n in block 134. The user can then use the joined upstream and downstream lines n to make a call in the conventional manner. The multiplexer monitors the status of the upstream and downstream lines n in block 136 to determine whether they have remained free for a predetermined period such as 30 seconds. If so, the multiplexer takes this as an indication that the outgoing call has been completed, and that the user has not made another outgoing call immediately after terminating the first. In this event, the upstream line n is designated as available for assignment in block 138.

When a user picks up the phone, the multiplexer can simulate telephone service in a variety of ways, including full telephone service. In nominal operation, the multiplexer frees the respective upstream lines as quickly as possible. In more advanced operations, the multiplexer will emulate analog telephone service by creating a dial tone service, compressing the digitized voice signal with a voice coder (vocoder), and passing the voice signal along the upstream data link to a remote assembly capable of delivering the telephone call along the public switch telephone network (PSTN). The advantage of the advanced POTS emulation mode is that the vocoded signal consumes a small fraction of the data carrying capacity of a single upstream data link, at the disadvantage of requiring additional equipment upstream.

FIG. 5 shows the manner in which incoming digital data is serviced by the multiplexer. When incoming digital data appears on upstream line n, the multiplexer receives a packet fragment on upstream line n from the upstream access server/router (or concentrator, aggregator, or gateway) in block 100. The multiplexer then assembles received packet fragments from upstream line n with other packet fragments received on other upstream lines to form a serial stream of packets in block 102. In block 104 the multiplexer transmits the assembled serial stream of packets to the user on the respective downstream line n.

FIG. 6 is a flowchart of the outgoing data service routine. This routine is initiated when a user begins to send outgoing digital data via a modem or other device. In block 150 the multiplexer determines the number of upstream lines to be initially assigned to the downstream line n to meet the data transfer requirements. For example, if each of the upstream data lines is capable of carrying digital data at a maximum rate of 25 kbps, and if the data transfer requirement for a particular class of service is 250 kbps, the multiplexer may determine in block 150 that ten upstream lines are to be assigned to the downstream line n. This assignment is made in block 152 from the subset of upstream lines that are currently available for assignment. The multiplexer then establishes calls with the ISP over all of the assigned upstream lines in block 154. In this example, ten separate calls are established with the single ISP with which the user is communicating.

The multiplexer then updates the multi-link protocol for this data transfer to reflect the increased number of upstream lines 156 being used to transfer data between the ISP and the user. The spatial multiplex Multi-link Point-to-Point Protocol (M-PPP) was developed by the Internet Engineering Task Force to provide a larger data pipe from a number of discrete smaller data pipes. Well-known documentation for M-PPP describes the protocol and operation of these abstract links. A similarly applicable protocol is Inverse Multiplexing of ATM (IMA). Other bonding protocols or methods may apply. The multiplexer described above creates the physical links that support these protocols. Each physical link is established by a respective upstream modem connecting to a modem with a connection to an Internet service provider (ISP). A stream of packets from a remote server is divided by intermediate network equipment, such as the ISP router, into a new, spatial multiplex of packets. These re-multiplexed packets are carried over the many upstream parallel data links established by the multiplexer, and are reassembled by the multiplexer into a serial stream of packets. This serial stream of packets is finally sent downstream, e.g. using DSL techniques, to the user. More advanced spatial multiplex algorithms can perform partitioning of streams with unequal error protection (forward error correction), interleaving, and delay in response to content or system state such as class of service, congestion, or buffer fullness. If desired, multiple downstream data links may be used to transmit data to the user at a high data rate.

Next, in block 158 the multiplexer uses M-PPP to split each outgoing data packet into fragments and to send the fragments via respective ones of the assigned upstream lines to the ISP. In this example, each outgoing packet is split into ten packet fragments, and each of the ten packet fragments is sent to the ISP over a respective one of the ten assigned upstream lines. Next, in block 160, the multiplexer monitors the data traffic on the downstream line n and increases or decreases the number of upstream lines assigned to the downstream line n as needed to maintain an adequate data transfer rate. Control is then returned to block 154, in which any additional calls are made to the ISP, and to block 156, in which the multi-link protocol is updated if necessary, and so forth.

FIGS. 7a–7c illustrate how the multiplexer 10 provides varying classes of service to the users on the downstream lines in accordance with real-time data transfer rate requirements. In FIG. 7a, the multiplexer 10 assigns only a single one of the upstream data links 16 to each of the downstream data links 18. In this mode of operation, the multiplexer 10 is performing the function of a junction box, and each of the downstream data links is provided with a first class of service, adequate only for a low data rate (e.g. 25 kbps). Such a first class of service is suitable for voice communication or low-data-rate digital communication.

As shown in FIG. 7a, the multiplexer preferably maintains the original wire mapping in case the multiplexer is unpowered so that default and lifeline POTS service can pass through the multiplexer with zero impact. Each multiplexer is assigned a dedicated Internet Protocol (IP) address, and/or a dedicated telephone number and telephone line for signaling and management, and to provide shorter latency response to data transfer requests than possible with multlink due to setup overhead. This unique IP address and/or line serves to identify the primary link between the multiplexer and the Internet, central office, DSLAM or other external equipment that the multiplexer may work with for data services. Upon commissioning, the multiplexer is in a standby mode, and functionally is a junction box that maps wires from the upstream data links to the downstream data links. To initiate the multiplexer the Network Operation Center remotely establishes an SNMP or telnet session with the multiplexer, tests line conditions, updates latest firmware, and the like. Other initiation means include wireless ports, http servers, Ethernet ports, WAN ports, and local craft interfaces such as RS-232 console interfaces. As explained above, the multiplexer maintains a database of line mappings (which upstream data links are assigned to each downstream data link) as well as line characteristics, such as frequency response, telephone numbers and various services associated with each line. These records may be copied or co-maintained by the Network Operations Center.

The primary operation of the multiplexer is to manage the supply and demand of data bandwidth between upstream services and downstream users, respectively. Line activity is measured both for requests for data and for opportunity to carry data. Upstream line assignments are made, maintained and terminated by the multiplexer.

The multiplexer assigns multiple upstream data links to individual downstream data links when necessary as described above. When activity is low, the multiplexer conserves power by keeping the number of upstream data links that are in use to a minimum. The primary upstream data link is always on in some capacity to deliver status, open data links, and provide early albeit low data rate responses to data requests.

FIG. 7b shows a second mode of operation of the multiplexer 10, in which the first downstream data link 18 is coupled with three of the upstream data links 16. As explained above, outgoing data from the first downstream data link is divided into packet fragments that are routed to respective ones of the three upstream data links 16, and incoming data from the three upstream data links are assembled to form a signal that is applied to the first downstream data link. In this mode of operation, the first downstream data link 18 is provided with a second class of service that provides a higher maximum data rate. For example, this higher data rate may be 75 kbps in the example of FIG. 7b, or substantially higher if a larger number of upstream data links are assigned to the respective downstream data link.

FIG. 7c is similar to FIG. 7b, except that only two of the upstream data links 16 are assigned to the first downstream data link 18. This represents an intermediate class of service, in this example having a maximum data rate of 50 kbps.

It should be emphasized that the multiplexer described above can be installed without changing the equipment at the central office or the upstream or downstream data links. Only splicing at the multiplexer is required in the simplest case, and this simplifies installation and reduces cost. Furthermore, this multiplexer can access existing ISP services using conventional protocols e.g., http, html, and ftp.

It should be apparent from the foregoing discussion that the multiplexer 10 described above creates near-instantaneous DSL service for users connected via the downstream data links to the multiplexer. Data delivered over individual downstream data links is multiplexed to one or more upstream data links, and data carried over multiple upstream data links is multiplexed onto a single downstream data link. The multiplexer applies statistical multiplexing to exploit periods where all or portions of individual upstream data links are unused to improve the rate of data transfer for those users transferring data at any given time. Portions of a data link include portions of a frequency spectrum or time periods.

The multiplexer can achieve data burst rates characteristic of typical dedicated DSL lines. Furthermore, the multiplexer can and typically will use many upstream data links that are at any given time unassigned by the telephone company to a specific user or are reserved for future telephone service. As described above, the multiplexer provides high-data-rate classes of service for occasional high-rate burst downloads, (e.g. in response to web page clicks) as well as steady, reliable, and low-latency connections for critical low-data-rate streams such as voice communication. Even in the worst-case scenario, where all of the upstream data links are limited to 26.4 kbps, the multiplexer can increase maximum data rates by assigning multiple upstream data links to a single downstream data link requiring higher data transfer rates.

The multiplexer reacts to the system state, service parameters and data content to provide an appropriate assignment between upstream data links and downstream data links. The system state includes parameters such as buffer fullness, trunk utilization, and time intervals to which such measurements apply.

Service parameters that influence the assignment of upstream data links to downstream data links include quality of service, user quotas and meters, user or data priority, service class, latency, data content, power, and signal error rate. A speech channel in general is accorded full quality, high priority and minimum latency. Fortunately, speech channels are also low bit rate, so their cost is small and easily accommodated. A user who requests an occasional web page (http request) can be given priority over a bandwidth hog who continually downloads large files (via e.g. ftp requests). At the same time, a user who is in urgent need of a large file can be given priority over other users. In some applications, long latency may be acceptable, as long as the average data rate is high.

Data parameters include the session identification number, network destination or source address, status indicators, packet length, and the like.

The system described above creates new functionality such as emergency communication back-up links that operate under conditions that regular POTS voice links would not, signal regeneration, high speed network neighborhoods allowing users common to a single multiplexer to exchange file at full DSL rates, and other unique features.

The Embodiment of FIGS. 8–13

Figure 8:
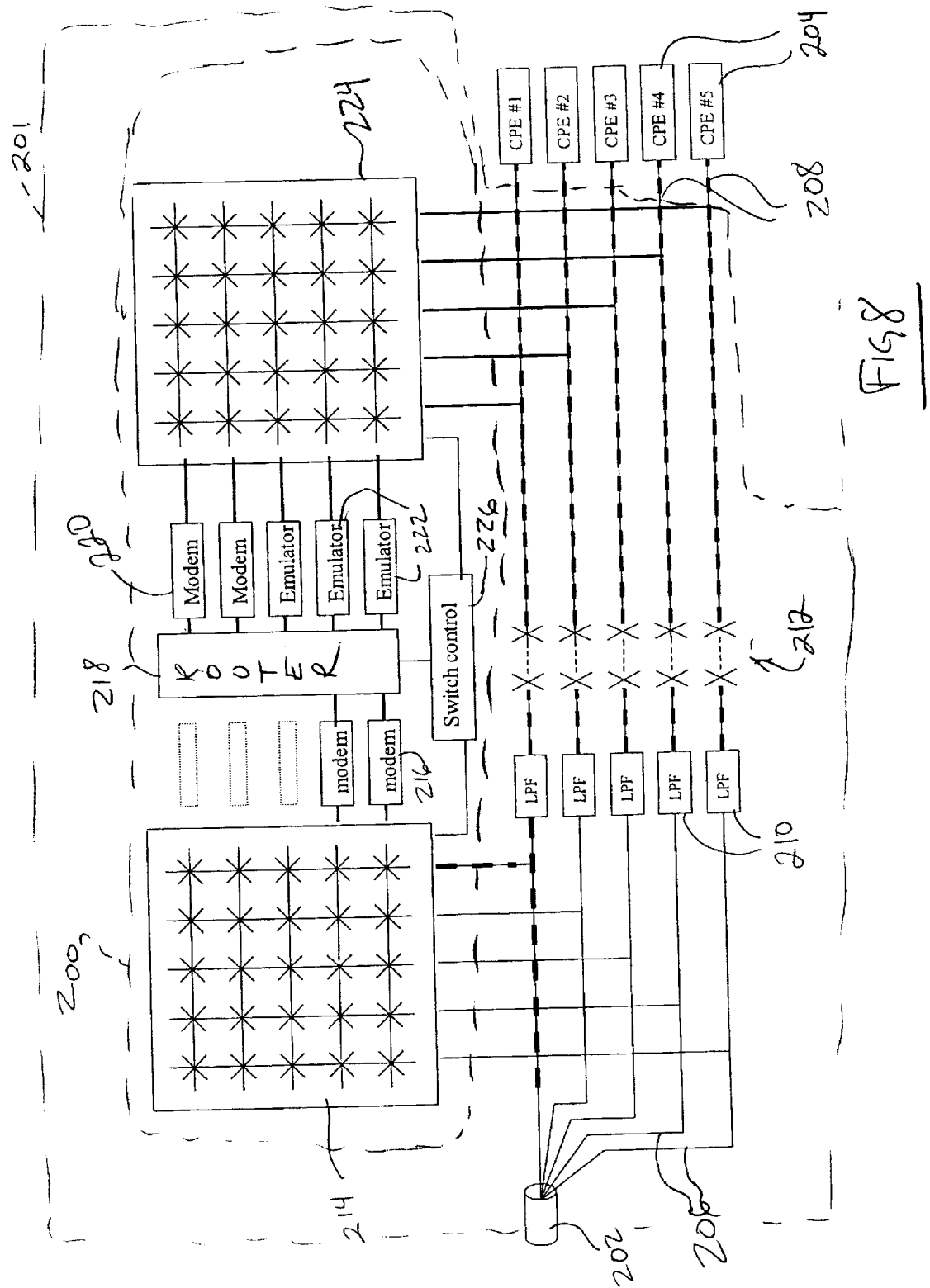
FIG. 8 is a block diagram illustrating a second preferred embodiment of the system of this invention.

FIG. 8 schematically represents another multiplexer 200 that performs some of the same functions as those described above in conjunction with the multiplexer 10, and that also functions as a remote access node. The multiplexer 200 is well adapted for use inside an enclosure such as a conventional pedestal enclosure 201 that is located near the customer premises equipment. The pedestal enclosure is typically the final splice or wire mapping point in the telephone network before the customer premise. The pedestal enclosure may be located on the ground near the customer premise or on the side of a telephone pole. Typically, no more than five customer premises are wired to each pedestal enclosure.

In this example, the pedestal enclosure receives multiple twisted pair cables via a wire bundle 202 that is connected to a network interface such as a central office, a DSLAM or a DLC (Digital Line Concentrator). Network interfaces are described in greater detail below. The pedestal enclosure includes a wire mapping system 212 that maps selected upstream data links 206 to selected downstream data links 208. The downstream data links 208 are connected in the conventional manner to respective customer premises equipment (CPE) 204. In this example, there are five sets of CPE 204, and each set can receive one, two, three, or more separate data links. For example, the wire bundle 202 can include 20 or 25 upstream data links 206, subsets of which are directed to the respective CPE's 204 by the wire mapping system 212. In this example, each of the upstream data links 206 is coupled to a low-pass filter 210. The purpose of the low-pass filters 210 is to block the transmission of high-frequency digital signals (e.g., digital signals associated with DSL modems) from transmission directly via the wire mapping system 212 from the customer premises equipment 204 to the upstream network interface.

Typically, the pedestal enclosure encloses a small volume, e.g., less than one cubic foot, and it is positioned close to the associated customer premises, e.g., with an average downstream data link distance of less than 1000 feet. The upstream data links are limited to a small number, e.g., no more than 50 twisted pair conductors, as are the downstream data links, e.g., no more than 25 drop wires terminated at no more than 5 customer premises.

The multiplexer 200 provides an alternative interconnection between the upstream data links 206 and the downstream data links 208. As shown in FIG. 8, the multiplexer 200 includes an upstream dynamic switching matrix 214 that is connected to each of the upstream data links 206. The switching matrix 214 is also connected to each of a set of upstream modems 216. These modems 216 are also connected to a router and storage device 218. Similarly, a downstream dynamic switching matrix 224 is connected to each of the downstream data links 208. The switching matrix 224 is also connected to a set of downstream modems 220 and to a set of modem emulators 222. The downstream modems 220 and the modem emulators 222 are each connected to the router and storage device 218. A switch control 226 controls the switching matrixes 214, 224 and coordinates the control of the switching matrices 214, 224 with the router and storage device 218. The switch control 226 can connect any one of the modems 216 to any one of the upstream data links 206 with the switching matrix 214, and any one of the modems 220 or emulators 222 to any one of the downstream data links 224 with the switching matrix 224.

In one particular application, the multiplexer 200 can be used to provide DSL service to the CPE 204 in a low-cost manner. In this example, one or more of the CPE 204 includes a DSL modem, and one or more of the upstream modems 216 comprise respective DSL modems. The DSL signal from the network interface (e.g. a DSLAM) enters the pedestal enclosure through either a dedicated telephone line or through a telephone line that is shared with a POTS signal in the conventional manner. The preferred DSL signal complies with ITU-T G.992.2 (the so-called G.LITE Standard). This is a low data rate ADSL variation having a maximum data rate of 1.5 mbps that does not require a low-pass filter or other splitter at the CPE to stop high-frequency signals from reaching POTS telephone equipment. The low-pass filters 210 block the high-frequency signals generated by the upstream network interface, the modems 216, 220, or DSL modems included in the customer premise equipment from interfering with upstream POTS equipment. The low-pass filters 210 perform much the same function as a conventional DSL splitter. In the downstream direction, the low-pass filters 210 separate downstream DSL signals from POTS signals carried along a common wire pair. In the upstream direction, the low-pass filters 210 combine the separate DSL and POTS signals into a common wire pair. Several low-pass filter designs are developed in Understanding Digital Subscriber Line Technology, by Thomas Starr, et al. (Prentiss Hall, January 1999).

The router and storage device 218 and the switch control 226 allow modems in the customer premise equipment 204 to share the modems 220, 216 by making appropriate connections with the switching matrices 214, 224 and routing digital data between appropriate modems 220, 216, formatted as individual bits of data, data frames, cells, or packets.

The example of FIG. 8 includes two upstream modems 216 which in this case both take the form of DSL modems. In alternative embodiments, a larger number of upstream modems, or only a single upstream DSL modem may be used. The advantage of having two or more upstream modems 216 is that both can be allocated to a single subscriber at a single customer premise in order to increase the data rate provided to that subscriber, all as described above in conjunction with the multiplexer 10. The upstream switching matrix 214 provides great flexibility, in that any upstream data link 206 can be assigned to any upstream modem 216. However, the switching matrix 214 and the switching matrix 224 are not required in all embodiments.

The downstream modems 220 connect the router and storage device 218 to the customer premise equipment 204. In this preferred embodiment, the downstream modems 220 and the modems included in the CPE 204 are capable of VDSL data rates (up to 50 mbps) due to the very short distances between the downstream modems 220 and the CPE 204. The router and storage device 218 routes data to a particular CPE 204 via a port connected to the appropriate downstream modem 220. Although the preferred embodiment of FIG. 8 has two downstream modems 220, alternative embodiments may have only one downstream modem 220 or more than two downstream modems 220.

When the modem of a CPE 204 is not connected to one of the downstream modems 220 by the switching matrix 224, it is connected instead to one of the emulators 222 by the switching matrix 224. The function of the emulator 222 is to emulate a modem to a sufficient extent to maintain the link. In the event the CPE modem is a conventional DSL modem, the emulator 222 may take the form of a DSL modem. Alternatively, if the CPE modem is modified as described below, the emulator 222 may be substantially simplified.

The router and storage device 218 performs the functions described above in conjunction with the multiplexer 10 of packet routing, switching, and port forwarding. The router and storage device 218 enables multiple downstream subscribers to share a common data link established by one or more of the upstream DSL modems 216. As used herein, the term "routing" is intended broadly to encompass the movement of digital data from one port to another. Ports may, for example, be virtual or physical ports, such as an I/O bus, or logical ports, such as software threads sharing data through memory transfer.

The router and storage device 218 can also route data between subscribers connected to a common pedestal enclosure or to separate pedestal enclosures that are interconnected via bridges established over the telephone network. For example, two DSL modems included in the customer premise 204 can be connected via the switching matrix 224 to two downstream modems 220, respectively, and the router and storage device 218 can route digital data between the two downstream modems 220. In this way, the multiplexer 200 makes possible a local area network with traditional Ethernet data rates. The multiplexer 200 may also route high-speed data between two devices included at the same customer premise, thus performing the function of a home network gateway. For example, customer premise equipment in one room of a house can route data through the outside pedestal enclosure to other customer premise equipment connected to a different PC located in another room inside the same house.

The switch control 226 determines when a packet is to be transferred to and from the customer premise equipment and to and from the network and controls the switching matrices 214, 224, the modems 216, 220, the emulators 222, and the router and storage device 238 accordingly. The control 226 may be responsive to parameters such as data content, quality of service requirements, and service class. For example, the switch control 226 and the router and storage device 218 may insure that regular time slots are made available to downstream subscribers involved in an active voice over IP session, while at the same time providing time slots for file transfers as they become available. Packet routing techniques such as Open Shortest Path First (John T. Moy, OSPF: Complete Implementation (Addison Wesley), ISBN:0201309661, December 2000) and Weighted Fair Queuing (David McDysan, QOS and Traffic Management in IT and ATM Networks (McGraw Hill), ISBN:0071349596, January 2000) can be used.

When the emulators 222 are designed for use with modified customer premise equipment, hand-shake signals including request to send (RTS) and clear to send (CTS) signals are used to control the flow of data. As shown in FIG. 9, the RTS and CTS signals can be allocated to separate frequency bands intermediate the frequency bands assigned to POTS signals and DSL signals. In this example, the CPE and the downstream modems 220 activate the RTS signal when either has data pending for transmission. The CPE and the modems 220 activate the CTS signal when either is ready to accept transmitted data. RTS and CTS signals are analogous to the corresponding signals in serial ports such as RS-232, but RTS and CTS signals are implemented here as separate tone signals rather than as signals on separate dedicated wires as in the RS-232 protocol.

In the example of FIG. 10, the RTS signal is activated by the multiplexer 200 when there is data pending to be transferred over one of the downstream modems 220 to the CPE. The CTS signal is activated only when the CPE is ready to receive data from the multiplexer 200. Since a full, dedicated DSL modem resides at each CPE, in most cases an RTS signal generated by one of the modems 220 is followed shortly by a CTS signal from the respective CPE. FIG. 10 provides an example, where downstream data is sent from one of the modems 220 to respective CPE modems during time blocks 230. Note that the data transmission starts after the CTS signal is sent, and that data transmission stops when the RTS signal is stopped. In this way, a single downstream modem 220 can be shared among multiple CPE modems (five in the example of FIG. 10).

Upstream data flow is different, since some time may pass after the time a RTS signal is generated by a CPE modem and before the corresponding CTS signal is generated by the interconnected downstream modem 220. This is because the particular downstream modem 220 may be engaged with other CPE at the time data transfer is requested.

Figure 11:
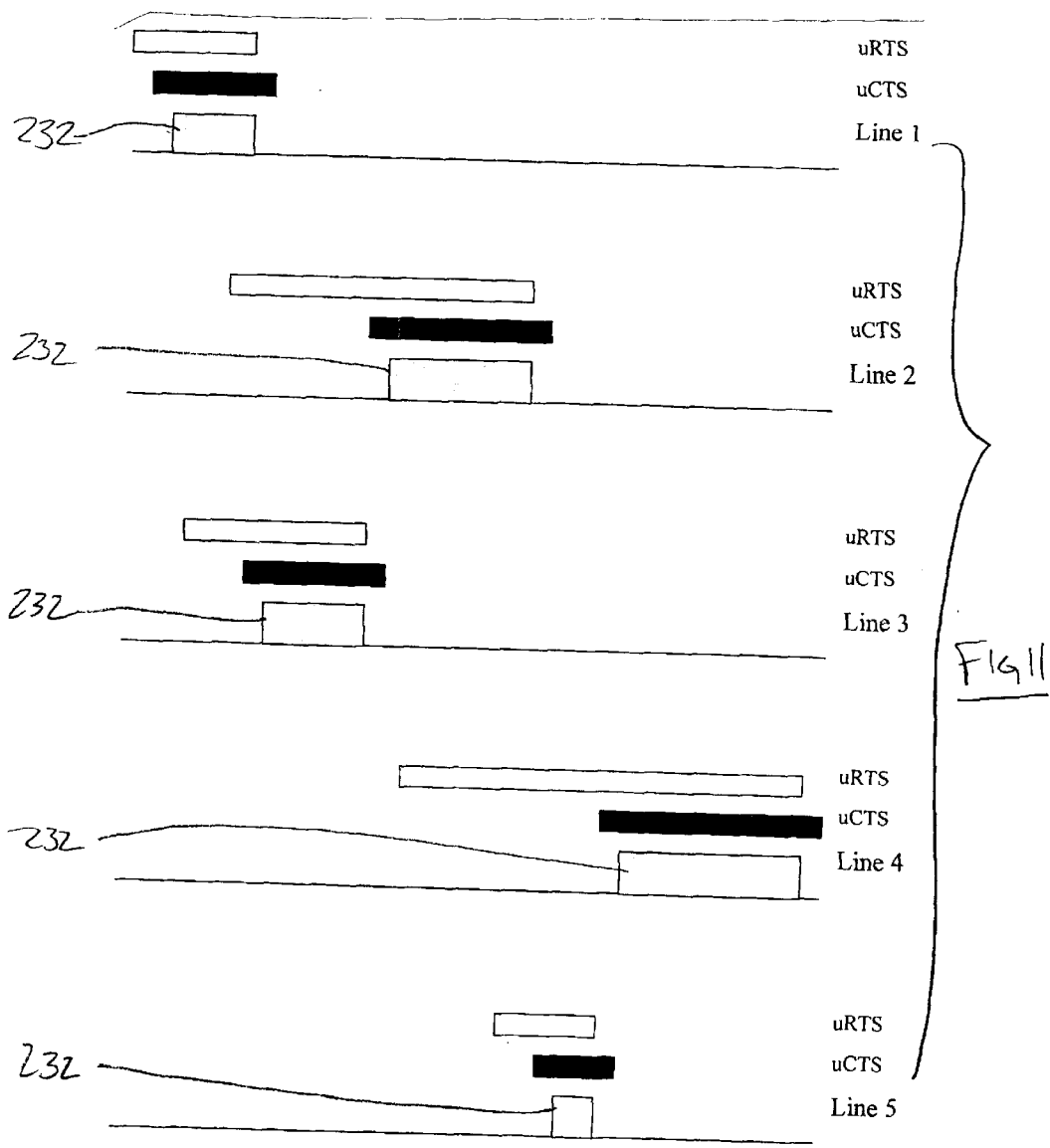

FIG. 11 shows one example, in which upstream RTS signals are generated at respective times by CPE on five separate lines. In FIG. 11, the RTS signal is generated by the CPE when it has data to transfer to the pedestal enclosure. Before transmitting data upstream, the CPE waits for the multiplexer 200 to activate the CTS signal. The CTS signal is generated by the interconnected modem 220 when permission is granted to the CPE to send data upstream. The digital data is then transferred from the CPE modem to the downstream modem 220 during time blocks 232. By virtue of the flexibility provided by the downstream switching matrix 224, the switch control 226 can dynamically assign any of the downstream modems 220 to any of the CPE 204 for a data transfer in either the upstream or the downstream direction.

The emulators 222 maintain the link with CPE modems and recognize the RTS signals generated by interconnected CPE modems. Once an RTS signal is recognized and passed to the router and storage device 238, the switch control 226 reconfigures the switching matrix 224 to interconnect the requesting CPE modem with one of the downstream modems 220 at the appropriate time.

Figure 12:
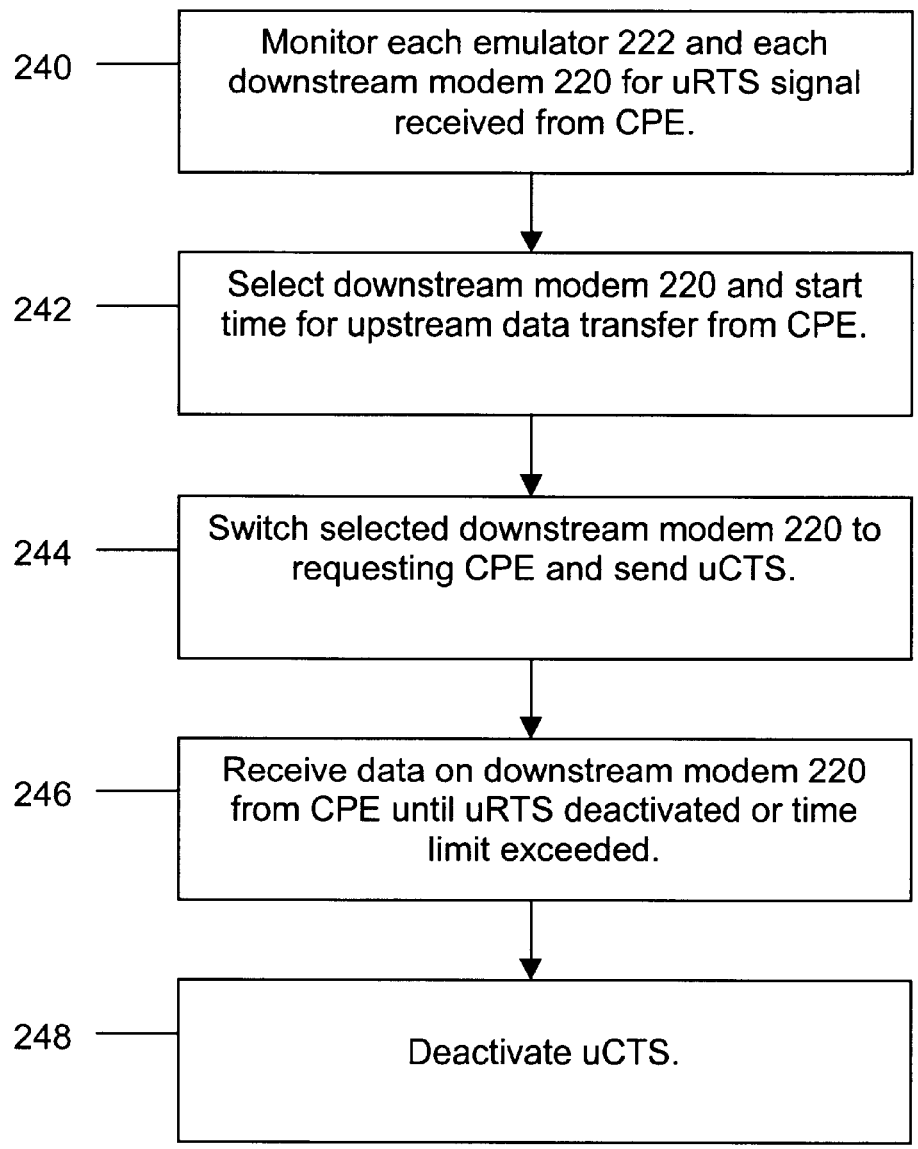
FIGS. 12 and 13 are flowcharts of processes implemented by the multiplexer of FIG. 8.

FIG. 12 provides a flow chart illustrating the manner in which the RTS and CTS signals are controlled in an upstream data transfer from one of the CPE 204 to the router and storage device 218. In block 240, the multiplexer 200 monitors each emulator 222 and each downstream modem 220 for an upstream RTS signal received from one of the CPE 204. Once an upstream RTS signal is received, a downstream modem 220 and a start time for an upstream data transfer from the requesting CPE are selected in block 242. At the appropriate time, a selected downstream modem 220 is switched to the requesting CPE 204 and the respective upstream CTS signal is activated in block 244. Then, in block 246 data is received on the switched downstream modem 220 from the requesting CPE until the requesting CPE disables the upstream RTS signal or a time limit is exceeded. Then, in block 248 the downstream modem 220 deactivates the upstream CTS signal.

Once the method of FIG. 12 has been used to transfer digital data from a requesting CPE to the router and storage device 218, the router and storage device can then transfer the data to an upstream data link 206 using one or more upstream modems 216 and the upstream switching matrix 214. In the case where only a single upstream modem 216 and only a single downstream modem 220 are used, this allows the modems 216, 220 to be shared by the CPE 204. Where multiple upstream modems 216 are included, and each has a lower maximum data rate than the downstream modems 220, data from a single CPE 204 can be transmitted to and from the network interface via multiple upstream modems 216 and multiple upstream data links 206, thereby increasing the maximum data transfer rate as described above in conjunction with FIGS. 5 and 6.

Figure 13:
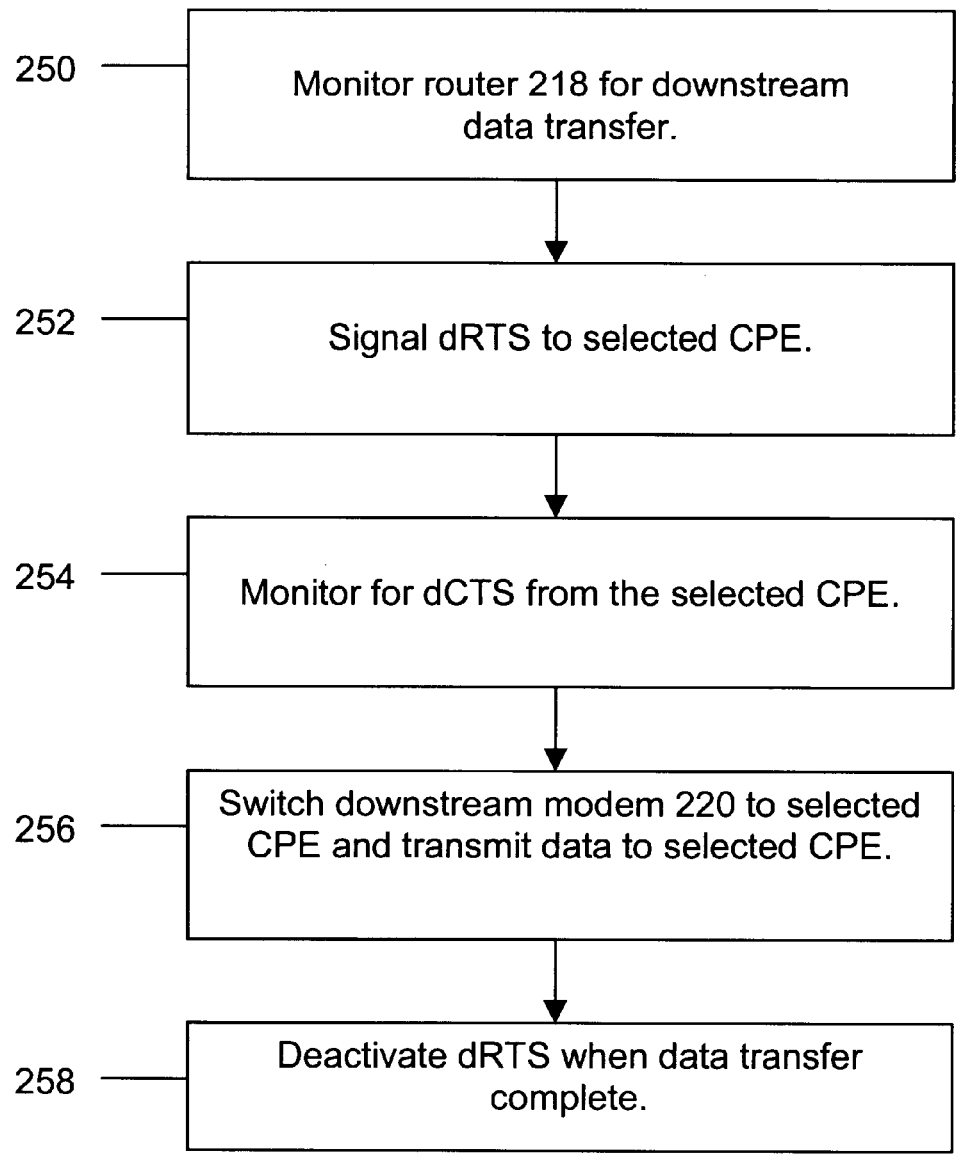

FIG. 13 shows a block diagram of a method for transmitting data from the router and storage device 218 to the CPE 204. In block 250 the switch control 226 monitors the router 218 for a downstream data transfer. The data to be transferred to the CPE may have reached the router and storage device 218 via one or more of the upstream data links 206 and one or more of the upstream modems 216. When such a downstream data transfer is recognized, the switch control 226 uses one of the emulators 222 or one of the downstream modems 220 to send a downstream RTS signal to the selected CPE (the intended recipient) in block 252. In block 254, the switch control 226 monitors the respective emulator 222 or downstream modem 220 for a downstream CTS signal from the selected CPE. Then, in block 256 one of the downstream modems 226 is switched to the selected CPE and data is transmitted from the router and storage device 218 to the selected CPE 204. In block 258 the RTS signal is deactivated after the data transfer is complete. The method of FIG. 13 is related to that of FIG. 5 discussed above, except in this case downstream modems 220 are switched to the selected CPE at only some times, when required for a data transfer.

Though FIGS. 12 and 13 have discussed upstream and downstream data transfer separately, full duplex modems will typically transfer data bi-directionally. For example, data may be transferred in one direction while control information such as an indication of whether the data has been successfully received is sent in the opposite direction. Thus, by strict technical definitions the transmitters and receivers operate simultaneously at both the CPE and the multiplexer 200.

The,multiplexer 200 reduces the cost of supplying DSL service to multiple subscribers. For the cost of setting up DSL service to a small number of upstream modems 216, DSL service is made available to the larger number of subscribers that are connected to the multiplexer 200. Furthermore, once the multiplexer 200 is installed, individual subscribers can be provided with DSL service by modifying in the software settings of the multiplexer, and the cost of a service call can be avoided.

The Network Interface

The central office discussed above is one example of a network interface, which interfaces the CPE with a network. The particular modem and protocols used by the multiplexer 10, 200 are largely dependent on the particular network interface to which it connects.

The network itself can be any service that connects multiple users. For POTS, the network is the PTSN (public telephone switched network), in which telephone calls are routed over local, regional, long distance, or international links. For PTSN, the network interface is the point where the local analog voice signal is converted to and from digital signals. This digitization point may be in a remote outside cabinet, such as a digital loop carrier (DLC) cabinet positioned between the central office and the CPE, and it may connect to the central office via fiber optic or T-1 digital high speed links. ISDN can also be considered as part of PTSN. Another type of network is the Internet.

For voice PTSN the network interface may be a subscriber line interface circuit (SLIC) or a DLC. For DSL systems, the network interface often takes the form of a digital subscriber line access multiplexer (DSLAM) which is a data packet analog to the voice DLC. Typically, a SLIC digitizes POTS phone signals at a data rate limited to 56K or 64K bps. For this reason, ISDN and DSL modem signals bypass the SLIC and are digitized at another point at the network interface, typically the DSLAM bank of DSLM modems. The voice digitization point (codec) may be moved outside the central office to a remote DLC, remote terminal, service area interface (SAI), crossbox, crosspoint, flexibility point, primary cross-connection point, distribution point, B-Box, controlled environment vault, pedestal, or other type of enclosure. Similarly, the DSLAM can be moved outside the central office into a separate enclosure located intermediate the central office and the subscriber. The advantage of a remote DSLAM is that it shortens the maximum length of the digital link, and allows many users connected to the DSLAM to load balance a more limited pipe to the central office. Often, the high speed data pipe from the remote DSLAM to the central office is either a fiber optic cable, a wireless link, or twisted copper pairs used to make a digital line such as a T-1 line. In an alternative embodiment, the SLIC or DLC function may be incorporated within the pedestal enclosure.

The networks described above can be considered as a collection of service points interconnected by a switch. In PTSN and ISDN, the transfer mechanism is the circuit switch carrying individual data units, usually at a fixed data rate. The source and destination network addresses are telephone numbers. For the Internet network, the transfer mechanism is packet switching, usually at a variable rate, with IP addresses as the source and destination addresses. A third network type, the ATM network, has properties of both packet and circuit switch networks.

From this discussion, it should be apparent that the wire bundle 202 can be connected to a central office, a SLIC, a DSLAM, a DLC, or other network interface.

The Data Links

In the foregoing discussion, the upstream and downstream data links 16, 18, 206, 208 have been described as twisted pairs of copper wire segments. Of course, there may be one or more splice points within a data link made up of copper wire, and a data link can include amplifiers, repeaters, regenerators, and splice points along the path. Though all such data links are shown in this application as a continuous line path, the term "data link" is intended broadly to encompass data links that include splice points, amplifiers, repeaters and regenerators. Also, data links are not limited to copper wire, and the term is intended broadly.

The upstream data links described above will often include twisted pair copper wires. However, this is not a requirement, and in some applications the upstream data links may include copper wires capable of digital signal transmission such as XDSL, fiber optic connections, wireless connections and free-space optical connections.

Similarly, though the downstream data links will often take the form of twisted-pair copper wires, the downstream links may include a separate wire different from that used for telephone service (e.g. an Ethernet cable), a wireless connection, or a superimposed data link that carries both voice and data (e.g. HPNA or XDSL).

Network Topology

Figure 14:
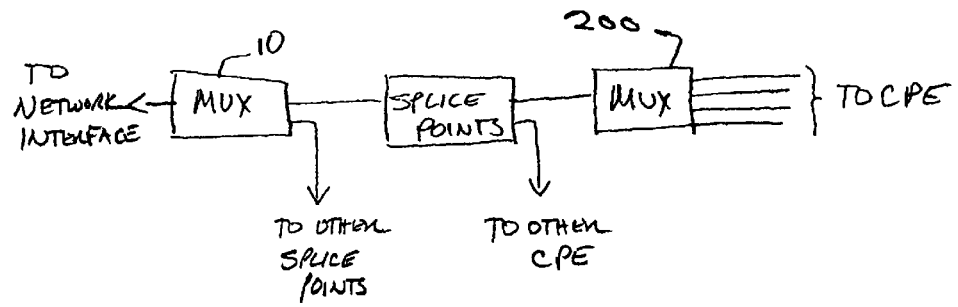
FIGS. 14 and 15 are schematic diagrams of two alternative network topologies implemented with the multiplexers of FIGS. 1 and 8.
Figure 15:
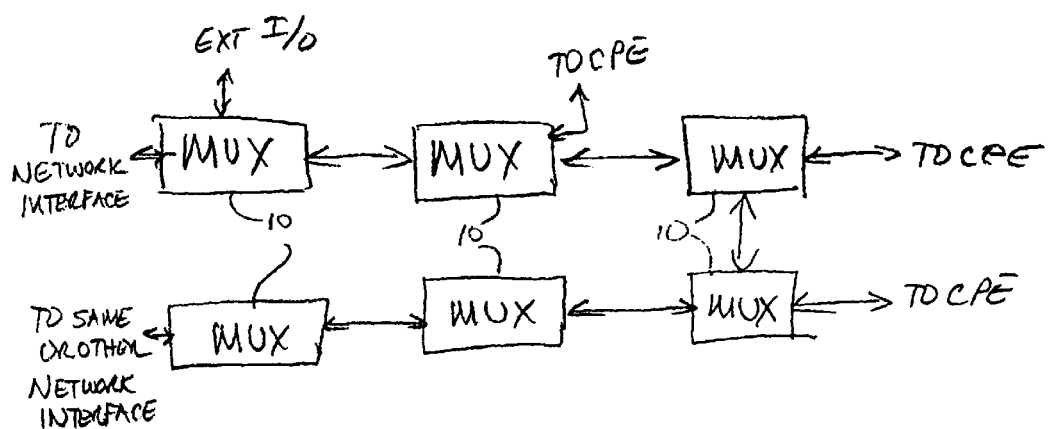

The embodiments described above can be adapted for use in more complex networks, in which various ones of the multiplexers are cascaded, bridged, or otherwise interconnected. For example, as shown in FIG. 14, the multiplexer 10 can be cascaded with the multiplexer 200 as well as with other pedestal enclosures and/or other CPE groups that do not include multiplexers 200. FIG. 15 shows another possible arrangement, in which multiple ones of the multiplexers 10 are connected together in cascade. In this case, the multiplexers 10 can operate as repeaters, amplifiers, regenerators, bridges, as well as multiplexers.

Figure 16:
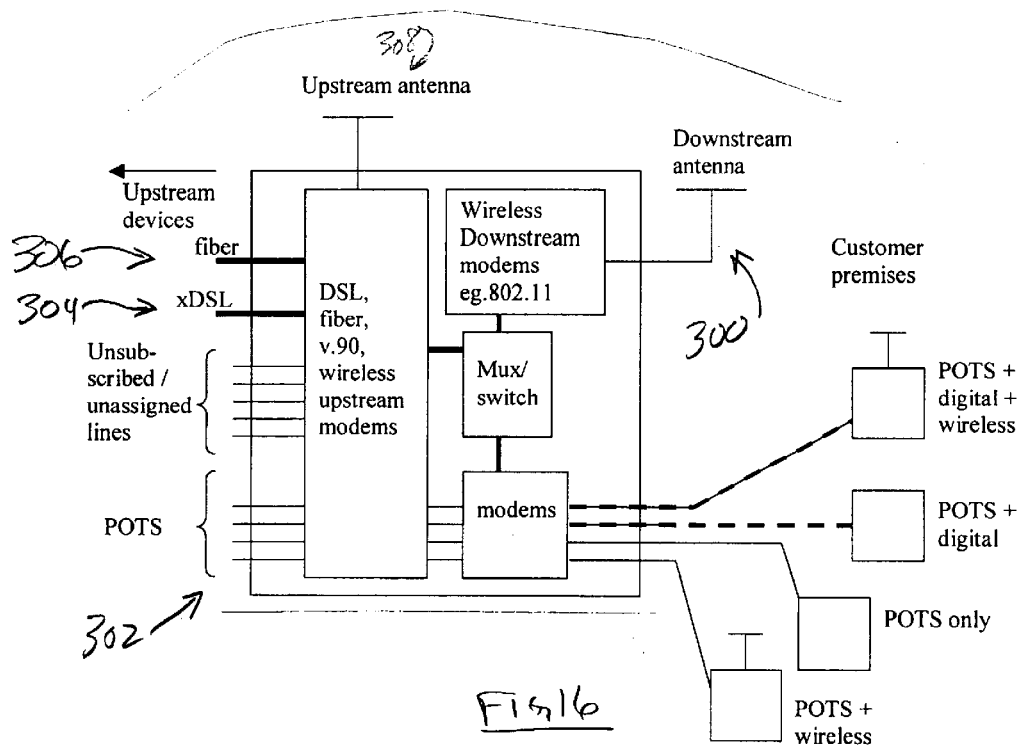
FIG. 16 is a schematic diagram of the multiplexer of FIG. 1 showing alternative forms of upstream and downstream data links.

FIG. 16 shows a modified form of the multiplexer 10. In the system of FIG. 16, downstream data links are provided that include a wireless link 300, and individual CPE may include any desired combination of POTS, wireless, and DSL modes of communication. Also, the system of FIG. 16 uses upstream data links of various types, including POTS twisted pairs 302, XDSL connections 304, optical fiber 306, and an upstream wireless link 308. Other upstream links can be established through WAN (Wide Area Network) ports of the multiplexer. Wireless data links, established by cellular telephone (3G, 4G, GSM, etc.) or satellite or terrestrial broadband (LMDS, MMDS), can be used for the upstream data links for various remote locations, to provide extra capacity (e.g.during periods of congestion, or when users pay for high priority downloads or links), inserting of data casting streams into the downstream multiplex, or backup links in case telephone wires are disrupted (improved robustness of lifeline service). POTS telephone signals over user downstream links are converted to compact vocoded signals and transmitted via wireless links to other multiplexers. In this way, 24 voice connections can be transmitted using only 125 kbps of wireless bandwidth, for example. The multiplexer can be patched or bridged to other networks, including other multiplexing networks, cable, satellite or the like.

Figure 17:
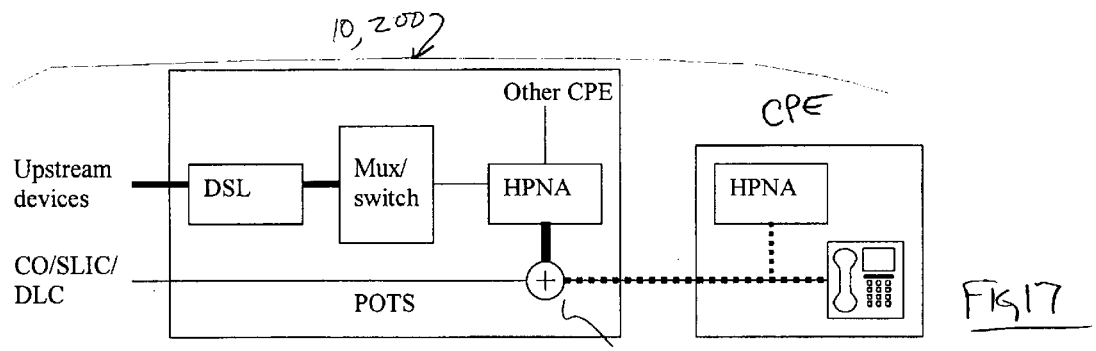
FIGS. 17 and 18 are schematic diagrams of alternative multiplexers of this invention showing the use of different types of downstream data links.

FIG. 17 shows an alternative embodiment in which POTS signals and home network (HPNA) signals are combined and delivered to the CPE over a single wire pair.

Figure 18:
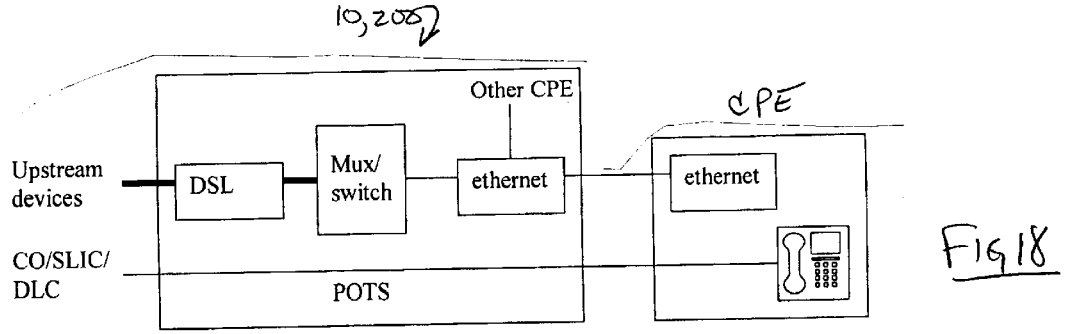

FIG. 18 shows an embodiment in which the telephone signals are delivered to the CPE on a telephone wire and digital data is transferred to the CPE via a separate wire connection (in this embodiment an Ethernet cable).

Specific Implementations

The multiplexer 10, 200 can also be programmed to load a file prescheduled by a user. This file would be downloaded with leftover upstream data link bandwidth and later transferred at a higher data transfer rate to the user over the respective downstream data link. Additional services such as file back-up can be created, where unique user files are transferred to the multiplexer storage device and eventually uploaded to a more remote storage facility over upstream data links as bandwidth becomes available.

The multiplexer can be used to supply voice over data to some or all of the users. In one approach, an analog POTS signal destined for a user's handset from the central office can be converted by the multiplexer into a vocoded signal and multiplexed into the user's downstream data link (e.g. with a POTS or DSL modem). This allows normal telephone operation from the perspective of the central office while keeping a data line active or always on from the user's point of view. More efficient use of the spectrum downstream is also possible that would otherwise be occupied by POTS analog voice signal and guardband. The user's computer or modem, or other network device, would then create a virtual phone service.

In another implementation, a dedicated POTS link is established over the user's downstream data link, where the voice signal is vocoded and multiplexed along an arbitrary upstream data link to a remote modem pool, DSLAM or other device. This scenario may be used for long distance service. If the local telephone company is involved cooperatively, it allows a POTS telephone to seamlessly access all of the services of a normal telephone and only consume a fraction of an upstream data link to the central data office. A DSL link may still be established via frequency division multiplex (FDM) on the same downstream data link, as is already done today with most DSL services on dedicated lines.

In use, the multiplexer 10 would first be spliced in place between the central office and the customer premise equipment, such that the original wire paths from the central office to the customer premise equipment are retained. Then the multiplexer is initialized, (either remotely or on site), by downloading firmware for the various components. The multiplexer calls up ISP modems and establishes sessions according to the multi-link point-to-point protocol, as described above, and an ISP link is always maintained for quick Internet response access and multi-link point-to-point session negotiation.

Transport Blocks

In one implementation, transport blocks are used for encapsulating all outgoing and incoming packets that pass through the multiplexer. Transport blocks reside in system memory and are created and read by the programs running on the digital signal processor and the CPU. The transport header determines which action the CPU and the DSP programs will take with regard to the transport block. For example, the transport header may identify where the transport block came from. From there, the CPU determines by parsing the transport block where each transport block is to be directed. For example, the transport block header may include the following fields:

transport id,
offset transport payload, created by CPU or DSP,
program thread id, source port id.

Counters track the number of transport blocks read and created by the CPU and DSP. This permits the CPU and DSP to know whether additional transport blocks are ready for processing. Separate tables for DSP and CPU created transport blocks may be managed.

Tables 1 and 2 provides examples of DSP packet processing procedures and CPU threads, respectively.

TABLE 1

DSP Packet Processing Procedures

```
for (;;)  {
          Read samples from input A/D FIFO
          Demodulate enough samples to extract a packet
          Decode packet
          Copy packet into system memory
          Read next output packet created by CPU
          Create framing for packet
          Modulate frames and store into output D/A FIFO
          }
```

TABLE 2

CPU thread:

```
for (;;)  {
          read next input DSP transport block from memory
          decode transport block
               routing: determine destination port,
          create new CPU transport block header for DSP, copy
          transport block into system memory output buffer
          }
```

Alternatives

Of course, many alternatives are possible to the preferred embodiments described above. For example, some of the upstream data links may be coupled between the central office and the multiplexer, while other ones of the upstream data links may bypass the central office and instead can connect to another network interface by means of a device such as a cable TV head end, a satellite network, terrestrial wireless network (MMDS, LMDS, UHF), or the like. In this alternative, digital modem links may bypass the central office in whole or in part, while traditional traffic such as voice and POTS modem traffic is transferred between the multiplexer and the central office.

In one simplified implementation, no vocoders are used, and no voice over I/P is provided. Analog voice data can be passed directly through the multiplexer when the off-hook detector determines that the line is being used for POTS voice connection.

In another alternative, the upstream modems of the multiplexer may include any desired combination of DSL and POTS modems, as appropriate for the particular application.

Additionally, the multiplexer can be used as an intelligent DSL signal regenerator, thereby shortening the greatest span between modems in the architecture and raising the maximum data rate.

Packets may be processed by the multiplexer before they are delivered to the upstream or downstream modems, for example for data compression reasons or others.

The multiplexers described above can be used to provide DSL service quickly and cheaply to subscribers. Once the multiplexer is in place, it can be expanded later, as the network is gradually upgraded. Thus, in one earlier application the multiplexer uses analog POTS modems to create POTS data links on the upstream data links and DSL service on selected ones of the downstream data links. The first multiplexer can be installed at a junction or a splice point close to the customer premise equipment. At least one trunk line, usually including 25 twisted-wire pairs, can serve as the upstream data links 16, and respective drop lines operate as the downstream data links.

The multiplexers can also be used as a means to increase the number of active telephone lines in areas undergoing rapid development. As necessary, additional multiplexers can be added at points closer to the central office or the remote DSLAM. This shortens the greatest distance between the end points of any individual link, thus increasing the data rate potential throughout the network. The multiplexer closest to the DSLAM or central office may connect using DSL modems for the upstream modems rather than analog POTS modems. Multiple multiplexers may be arranged in a cascade between the central office and the customer premise equipment. These multiplexers can operate as signal regenerators that provide advantages as compared with conventional amplifiers. In addition, fiber optic cable can be strung along the chain of multiplexers, or brought directly to the multiplexer closest to the customer premise equipment. In this example, the multiplexer serves as the receiving DSL modem bank that converts incoming data for optical transport.

Storage may be added to the multiplexer or connected to the multiplexer, through a WAN port for example, to create a combination of cache, temporary data storage, file backup and/or entertainment on demand.

External power sources such as solar, wind, hydroelectric, industrial battery bank, fuel cells, AC powered grid, user AC or DC power feed can be used.

The multiplexer may respond to an outgoing POTS call attempt by a user on a line in several ways. In the method described in FIG. 4, seamless transport of voice services through the multiplexer is facilitated by termination 128 (FIG. 4) of data links on upstream line n. During the period between offhook detection 52 (FIG. 2) and termination 128 (FIG. 4), a standby tone or signal may be generated by the multiplexer until the line is released and dial tone services pass through from the Central Office, Class 5 switch, SLIC, PTSN switch or other POTS equipment. The multiplexer may signal a special "busy" tone indicating a condition of no temporary upstream POTS/PTSN connection. A 120 IPM (Impulse Per Minute) "re-order" signal traditionally indicates "all circuits are busy," usually trunk line circuits, and may be generated by the multiplexer so that CPE can recognize this case. Alternatively seamless dial tone service may be emulated by the multiplexer that may include decoding (e.g. DTMF) of dialed digits from the downstream side of the line, buffering of digits by the multiplexer, and regeneration of the digits on the upstream side. After the dial sequence has been regenerated, upstream and downstream sides are joined (through a cut-through sequence) in the state 132 (FIG. 4).

Outgoing POTS calls may also be passed through the multiplexer through alternative network means other than the POTS local loop. The POTS call on the downstream side of the multiplexer may be converted by the multiplexer into a digital form, such as by a vocoder, and conveyed upstream to a PTSN interface at the Central Office (ILEC) or other carrier service, such as a CLEC, long distance service, ISP, voice over IP, or other voice networks. The multiplexer will assign a higher priority (class of service, QoS) and lower delay (latency) for coded voice data than most classes of service, and may multiplex the coded voice data differently through the upstream multilink than other data classes. Most vocoder methods however provide toll-grade or better-than-POTS voice quality in less than 10 kbps.

In a shared modem scenario depicted in FIG. 8, where there are fewer downstream modems (220) than CPE (204), and the modems (220) and CPE (204) embodiments do not perform the preferred CTS, RTS signaling means (FIGS. 10, 11, 13), the multiplexer can monitor downstream links for traffic activity as CPE attempt to transmit data upstream. The CPE encounters a busy state, similar to that of upstream network congestion, until the multiplexer switches a modem (220) to the downstream line.

Packet grooming and IP multicasting (IPmc) are an advanced routing capabilities of the multiplexer. When multiplexers 10 are connected in cascade (subtended), as shown in FIGS. 14 and 15, data is only passed through the cascade only as far as users who request or are monitoring the data.

The unique placement of the internal switch and routing capability of multiplexer 10 within the telephone network permits high-speed neighborhood LANs to be established. VDSL, Ethernet, HPNA signals can link neighbors connected to a common multiplexer 10, or to a short number of hops of subtended or bridged multiplexers (FIGS. 14 and 15). Files, streams, and other data can be exchanged at higher speeds than possible by routing through the ISP or services connected upstream of the multiplexer. A practical application of the neighborhood LAN envisioned include connecting offices or campus networks consisting of separated buildings, or lot partitions served by separate phone lines that may not belong to a common PBX or remote DLC or DSLAM.

The multiplexer 10 may first be installed at a location within the telephone network that requires upstream data links to be established through "inband" POTS connections (e.g., at a maximum data rate of less than 60 kbps for each datalink). As the network evolves, or as customer demand justifies, "out-of-band" or digital links such as xDSL (e.g., at a maximum data rate in excess of 100 kbps for each data link), and eventually fiber optic links (e.g., at a maximum data rate in excess of 1 Mbps per data link), can connect to multiplexers enabling higher speed service to downstream users. The expansion capabilities of the multiplexer provide a convenient access point to bridge high speed links.

Definitions

The term "customer premise equipment" is intended broadly to encompass any equipment in the customer premise used to supply signals to the telephone system. Depending upon the application, customer premise equipment can include a wide variety of handsets and modems, of any desired type.

The term "data" is used broadly to refer to information-carrying signals, whether digital or analog, including voice, computer, and other data.

The term "coupled" is intended broadly to indicate that two elements exchange information. Thus, first and second elements are said to be coupled when they are directly connected with one another via a suitable data link, as well as when they are connected with one another via one or more unnamed intermediate elements. Thus, a multiplexer is said to be coupled with a central office, whether or not intermediate relays, repeaters, DSLAMs or the like are provided between the multiplexer and the central office.

The term "data link" is intended broadly to cover a wide variety of links for transferring data, including wired and wireless data links. Examples of wired data links include twisted-pair and coaxial conductor data links, and examples of wireless data links include RF and optical data links.

The term "monitor" is intended to encompass both periodic monitoring, such as poling, and continuous monitoring, such as that implemented by computer interrupts.

The term "modem" is intended broadly to include modems implemented as separate devices, as well as modems implemented as threads executed by a digital signal processor.

The term "set" is intended broadly to mean one or more. Thus, a set of modems can include one, two or more modems.

CONCLUSION

The foregoing detailed description has discussed only a few of the many forms that this invention can take. For this reason, this detailed description is intended by way of illustration and not limitation. It is only the following claims, including all equivalents, that are intended to define the scope of this invention.

What is claimed is:

1. A method for transferring data with a plurality of customer premises, said method comprising:
   (a) providing a multiplexer comprising a set of upstream modems, a set of downstream modems, a set of upstream data links, each coupled with at least one upstream modem of the multiplexer, and a plurality of downstream data links, each coupled between at least one downstream modem of the multiplexer and a respective customer premises equipment, wherein the upstream data links are characterized by a maximum data rate less than 60 Kbps;
   (b) assigning a first and a second one of the upstream data links to a first one of the downstream data links with the multiplexer;
   (c) monitoring a second one of the downstream data links for an off-hook condition; and
   (d) when the off-hook condition is detected in (c), automatically re-assigning the second upstream data link from the first downstream data link to the second downstream data link,
   (e) adding additional upstream data links to the multiplexer at a first time, subsequent to (a), wherein the additional upstream data links are characterized by a maximum data rate greater than 100 Kbps,
   (f) adding optical fiber upstream data links to the multiplexer at a second time subsequent to the first time, wherein the optical fiber upstream data links are characterized by a maximum data rate greater than 1 Mbps.

2. A method for transferring data with a plurality of customer premises, said method comprising:
   (a) providing a multiplexer comprising a set of upstream modems, a set of downstream modems, a set of upstream data links, each coupled with at least one upstream modem of the multiplexer, and a plurality of downstream data links, each coupled between at least one downstream modem of the multiplexer and a respective customer premises equipment, wherein the upstream data links are characterized by a maximum data rate less than 60 Kbps;
   (b) assigning a first one of the upstream data links to a first one of the downstream data links for voice communication while the first downstream data link is off-hook;
   (c) monitoring the first downstream data link for an on-hook condition;
   (d) after the on-hook condition is detected in (c), automatically re-assigning the first upstream data link to another one of the downstream data links
   (e) adding additional upstream data links to the multiplexer at a first time, subsequent to (a), wherein the additional upstream data links are characterized by a maximum data rate greater than 100 Kbps,
   (f) adding optical fiber upstream data links to the multiplexer at a second time subsequent to the first time, wherein the optical fiber upstream data links are characterized by a maximum data rate greater than 1 Mbps.

3. A method for transferring data with a plurality of customer premises, said method comprising:
   (a) providing a multiplexer comprising a set of upstream modems, a set of downstream modems, a set of upstream data links, each coupled with at least one upstream modem of the multiplexer, and a plurality of downstream data links, each coupled between at least one downstream modem of the multiplexer and a respective customer premises equipment, wherein the upstream data links are characterized by a maximum data rate less than 60 Kbps;
   (b) assigning a first and a second one of the upstream data links to a first one of the downstream data links with the multiplexer;
   (c) monitoring for an incoming call directed to a second one of the downstream data links; and
   (d) when the incoming call is detected in (c), automatically re-assigning the second upstream data link from the first downstream data link to the second downstream data link,
   (e) adding additional upstream data links to the multiplexer at a first time, subsequent to (a), wherein the additional upstream data links are characterized by a maximum data rate greater than 100 Kbps,
   (f) adding optical fiber upstream data links to the multiplexer at a second time subsequent to the first time, wherein the optical fiber upstream data links are characterized by a maximum data rate greater than 1 Mbps.

4. A method for transferring data with a plurality of customer premises via respective telephone lines, said method comprising:

(a) providing a multiplexer, a set of upstream data links, each coupled with the multiplexer, and a set of downstream data links, each coupled between the multiplexer and a respective customer premise equipment, each downstream data link comprising a respective telephone line, wherein the upstream data links are characterized by a maximum data rate less than 60 Kbps;

(b) when any one of the customer premise equipment requests a first class of service, characterized by a first, lower maximum data rate on the respective telephone line, transferring data between the associated downstream data link and a single respective one of the upstream data links with the multiplexer; and (c) when any one of the customer premise equipment requests a second class of service on the respective telephone line, characterized by a second, higher maximum data rate, transferring data between the associated downstream data link and multiple ones of the upstream data links with the multiplexer, (d) adding additional upstream data links to the multiplexer at a first time, subsequent to (a), wherein the additional upstream data links are characterized by a maximum data rate greater than 100 Kbps, (e) adding optical fiber upstream data links to the multiplexer at a second time subsequent to the first time, wherein the optical fiber upstream data links are characterized by a maximum data rate greater than 1 Mbps.

5. The method of claims 1, 2, 3, or, 4 wherein at least some of the downstream data links provided in (a) each comprise a respective twisted pair wire connection.

6. The method of claims 1, 2, 3, or 4 wherein at least some of the upstream data links provided in (a) each comprise a respective twisted pair wire connection.

7. The method of claim 5 wherein at least some of the upstream data links provided in (a) each comprise a respective twisted pair wire connection.

8. The method of claims 1, 2, 3, or 4 wherein at least some of the downstream data links provided in (a) each comprise a respective analog POTS line.

9. The method of claims 1, 2, 3, or 4 wherein at least some of the upstream data links provided in (a) each comprise a respective analog POTS line.

10. The method of claim 8 wherein at least some of the upstream data links provided in (a) each comprise a respective analog POTS line.

11. The method of claim 2 wherein the other one of the downstream data links of (d) is characterized by a data rate requirement higher than 28 Kbps.

12. The method of claim 4 wherein the first class of service is adapted for voice communication.

13. The method of claim 4 or 12 wherein the second class of service is adapted for Internet communication.

14. The method of claim 4 wherein the first, lower maximum data rate is no more than 56 kbps.

15. The method of claim 4 or 14 wherein the second, higher maximum data rate is no less than 100 kbps.

16. The method of claims 1, 2, 3, or 4 wherein at least some of the upstream data links are coupled with a central office.

17. The method of claims 1, 2, 3, or 4 wherein each upstream data link is coupled with a central office.

18. The method of claims 1, 2, 3, or 4 wherein the customer premises equipment comprises at least one handset that exchanges voice data with the multiplexer.

19. A method for transferring data with a plurality of customer premises, said method comprising:

(a) providing a multiplexer comprising a set of upstream modems, a set of downstream modems, a set of upstream data links, each coupled with at least one upstream modem of the multiplexer, and a plurality of downstream data links, each coupled between at least one downstream modem of the multiplexer and a respective customer premises equipment;

(b) transmitting data between (1) multiple ones of the upstream data links and (2) a first one of the downstream data links at a data rate in excess of 100 Kbps;

(c) adding additional upstream data links to the multiplexer at a later time, subsequent to (a), wherein the additional upstream data links are characterized by a maximum data rate greater than 100 Kbps; and (d) adding optical fiber upstream data links to the multiplexer at a time subsequent to the later time wherein the optical fiber upstream data links are characterized by a maximum data rate greater than 1 Mbps.

* * * * *